(12) United States Patent
Sveum et al.

(10) Patent No.: US 7,841,823 B2
(45) Date of Patent: Nov. 30, 2010

(54) BRACE SYSTEM AND METHOD FOR A VEHICLE AT A LOADING DOCK

(75) Inventors: Matt Sveum, Wauwatosa, WI (US); Matthew Tourdot, Whitewater, WI (US); Dave Holm, Kewaskum, WI (US); David Klumb, Jackson, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 382 days.

(21) Appl. No.: 10/743,577

(22) Filed: Dec. 22, 2003

(65) Prior Publication Data

US 2005/0169732 A1   Aug. 4, 2005

(51) Int. Cl.
*B60R 99/00* (2009.01)
(52) U.S. Cl. .................................... 414/800; 414/401
(58) Field of Classification Search ................ 414/372, 414/360, 367, 401, 396, 584, 800
See application file for complete search history.

(56) References Cited

U.S. PATENT DOCUMENTS 1,778,852 A   10/1930   Fitch (Continued)

FOREIGN PATENT DOCUMENTS

CH   0383789   10/1964

(Continued)

OTHER PUBLICATIONS

"Trailerjack" brochure, distributed by Rite-Hite Europe on Jan. 1, 2000 (3 page).

(Continued)

*Primary Examiner*—Gregory W Adams
*Assistant Examiner*—Joshua I Rudawitz
(74) *Attorney, Agent, or Firm*—Hanley, Flight & Zimmerman, LLC

(57) ABSTRACT

To help hold a (trailer) bed of a truck or trailer steady at a loading dock as the truck is being loaded or unloaded of its cargo, a yieldable vehicle brace exerts a substantial, but limited, reactive force upward against the trailer's rear impact guard to resist the trailer's downward movement. In some embodiments, the brace holds the trailer bed stationary up to a certain load limit and provides the trailer bed with a controlled or dampened descent when the load exceeds that limit. In some cases, the reactive upward force exerted by the brace increases with the downward velocity of the trailer bed. The reactive force can be created by one or more pressure relief valves, hydraulic fluid passing through a flow restriction, a brake, a spring, or various combination thereof. Some embodiments of the brace include provisions for accommodating horizontal movement of the rear impact guard.

23 Claims, 20 Drawing Sheets

U.S. PATENT DOCUMENTS

| | | | | |
|---|---|---|---|---|
| 2,017,392 | A | * | 10/1935 | Blake .......................... 104/256 |
| 2,637,454 | A | * | 5/1953 | Rowe .......................... 414/584 |
| 3,117,800 | A | | 1/1964 | Magnuson |
| 3,214,188 | A | | 10/1965 | Alfieri |
| 3,235,285 | A | | 2/1966 | Tenenbaum et al. |
| 3,694,724 | A | | 9/1972 | Eggert, Jr. |
| 3,765,692 | A | | 10/1973 | Barber et al. |
| 4,146,888 | A | * | 3/1979 | Grunewald et al. .......... 340/679 |
| 4,208,161 | A | | 6/1980 | Hipp et al. |
| 4,267,748 | A | | 5/1981 | Grunewald et al. |
| 4,282,621 | A | | 8/1981 | Anthony et al. |
| 4,307,876 | A | | 12/1981 | Cleaves |
| 4,335,901 | A | | 6/1982 | Gladish |
| 4,373,847 | A | | 2/1983 | Hipp et al. |
| 4,379,354 | A | | 4/1983 | Hahn et al. |
| 4,400,127 | A | | 8/1983 | Metz |
| 4,443,150 | A | | 4/1984 | Hahn et al. |
| 4,488,325 | A | | 12/1984 | Bennett et al. |
| 4,558,886 | A | | 12/1985 | Straub |
| 4,560,315 | A | | 12/1985 | Hahn et al. |
| 4,605,353 | A | | 8/1986 | Hahn et al. |
| 4,664,582 | A | | 5/1987 | Edmeads |
| 4,759,678 | A | | 7/1988 | Hageman |
| RE32,736 | E | | 8/1988 | Lovell |
| 4,784,567 | A | * | 11/1988 | Hageman et al. ............ 414/401 |
| 4,815,918 | A | | 3/1989 | Bennett et al. |
| 4,915,568 | A | | 4/1990 | West |
| 4,936,731 | A | | 6/1990 | Noble |
| 4,938,647 | A | * | 7/1990 | Erlandsson ................. 414/401 |
| 4,940,371 | A | | 7/1990 | Cholovich |
| 4,969,792 | A | * | 11/1990 | Ellis et al. .................... 414/401 |
| 5,004,394 | A | * | 4/1991 | Goodwin et al. ............ 414/346 |
| 5,068,938 | A | | 12/1991 | Roscoe |
| 5,192,057 | A | | 3/1993 | Wydra et al. |
| 5,212,846 | A | * | 5/1993 | Hahn .......................... 14/69.5 |
| 5,297,921 | A | | 3/1994 | Springer et al. |
| 5,340,141 | A | | 8/1994 | Thorndyke |
| 5,433,578 | A | | 7/1995 | Honan |
| 5,702,223 | A | | 7/1995 | Hahn et al. |
| 5,709,286 | A | | 1/1998 | Mead et al. |
| 5,845,579 | A | | 12/1998 | Langley et al. |
| 5,882,167 | A | | 3/1999 | Hahn et al. |
| 5,964,572 | A | | 10/1999 | Hahn et al. |
| 6,065,923 | A | | 5/2000 | Foster |
| 6,106,212 | A | * | 8/2000 | Hahn .......................... 414/401 |
| 6,116,839 | A | | 9/2000 | Bender et al. |
| 6,152,486 | A | | 11/2000 | Pierce |
| 6,190,109 | B1 | | 2/2001 | Bender |
| 6,199,876 | B1 | | 3/2001 | Eckelberry |
| 6,203,026 | B1 | | 3/2001 | Jones |
| 6,257,597 | B1 | | 7/2001 | Galazin |
| 6,317,914 | B1 | | 11/2001 | Preston |
| 6,322,310 | B1 | | 11/2001 | Bender et al. |
| 6,416,061 | B1 | | 7/2002 | French et al. |
| 6,431,819 | B1 | * | 8/2002 | Hahn .......................... 414/809 |
| 6,488,464 | B1 | * | 12/2002 | Kish .......................... 414/401 |
| 6,491,143 | B1 | | 12/2002 | Stenquist |
| 6,520,472 | B1 | | 2/2003 | Manich et al. |
| 6,726,432 | B2 | | 4/2004 | Kish et al. |
| 7,056,077 | B2 | | 6/2006 | Pedersen et al. |
| 2002/0131173 | A1 | | 9/2002 | Misaka |
| 2002/0168255 | A1 | * | 11/2002 | Kish .......................... 414/401 |
| 2003/0170096 | A1 | * | 9/2003 | Alexander ................. 414/401 |
| 2003/0170097 | A1 | | 9/2003 | Pedersen et al. |
| 2004/0003970 | A1 | | 1/2004 | Alexander |
| 2006/0182559 | A1 | | 8/2006 | Gleason |

FOREIGN PATENT DOCUMENTS

| | | |
|---|---|---|
| DE | 2239483 | 2/1974 |
| DE | 2952658 | 2/1981 |
| GB | 2223220 | 4/1992 |
| JP | 61114930 | 6/1986 |
| WO | 2006/091900 | 8/2006 |

OTHER PUBLICATIONS

"Pepsi Minneapolis Hydraulic Lift on ICC Bar" photographs; Apr. 18, 2001 (2 page).

"Trailer Lifting Installation Mead/Westvaco" Nov. 17, 2003.

Dayton, Joyce "Concept Drawing" Jan. 15, 1986 (1 page).

"Despringer System" photographs and drawings supplied by Allied Handling, Inc. in Spring 2000.

International Searching Authority, "Search Report and Written Opinion" International Application No. PCT/US2006/006753.

International Searching Authority, "International Search Report and the Written Opinion of the International Searching Authority, or the Declaration", Dec. 17, 2004, (17 pages).

International Searching Authority, "International Search Report," issued in connection with counterpart international application No. PCT/US2004/042558, mailed May 3, 2005, 4 pages.

International Searching Authority, "Written Opinion," issued in connection with counterpart international application No. PCT/2004/042558, mailed May 3, 2005, 7 pages.

The International Bureau of WIPO, "International Preliminary Report on Patentability," issued in connection with international application No. PCT/US2006/006753, mailed Sep. 7, 2007, 7 pages.

The International Bureau of WIPO, "International Preliminary Report on Patentability," issued in connection with counterpart international application No. PCT/US2004/042558, issued Jun. 26, 2006, 8 pages.

International Searching Authority, "International Search Report" issued in connection with international patent application No. PCT/2008/065643, mailed on Oct. 16, 2008, 4 pages.

International Searching Authority, "Written Opinion" issued in connection with international patent application No. PCT/US2008/065643, mailed on Oct. 16, 2008, 8 pages.

United States Patent and Trademark Office, "Final Office Action," issued in connection with U.S. Appl. No. 11/063,683, mailed Mar. 4, 2009, 12 pages.

United States Patent and Trademark Office, "Non-Final Office Action," issued in connection with U.S. Appl. No. 11/063,683, mailed Jul. 8, 2008, 9 pages.

United States Patent and Trademark Office, "Final Office Action," issued in connection with U.S. Appl. No. 11/063,683, mailed Dec. 19, 2007, 9 pages.

United States Patent and Trademark Office, "Non-Final Office Action," issued in connection with U.S. Appl. No. 11/063,683, mailed Mar. 23, 2007, 14 pages.

United States Patent and Trademark Office, "Restriction Requirement," issued in connection with U.S. Appl. No. 11/063,683, mailed Dec. 14, 2006, 6 pages.

Canadian Intellectual Property Office, "Office Communication," issued in connection with Canadian application No. 2,551,550, issued Jul. 2, 2008, 2 pages.

Canadian Intellectual Property Office, "Notice of Allowance," issued in connection with Canadian application No. 2,551,550, issued May 19, 2009, 1 page.

European Patent Office, "Descision to Grant European Patent," issued in connection with European application No. 04812707.8, issued Jun. 8, 2007, 1 page.

International Bureau, "International Preliminary Report on Patentability," issued in connection with international application serial No. PCT/US2008/065643, issued Jan. 5, 2010, 9 pages.

United States Patent and Trademark Office, "Non-Final Office Action," issued in connection with U.S. Appl. No. 11/772,445, mailed May 13, 2010 33 pages.

State Intellectual Property Office of China, "First Office Action," issued in connection with Chinese application serial No. 200480041834.1, issued Feb. 12, 2010, 5 pages.

United States Patent and Trademark Office, "Non-Final Office Action," issued in connection with U.S. Appl. No. 11/063,683, mailed Dec. 24, 2009, 12 pages.

United States Patent and Trademark Office, "Restriction Requirement," issued in connection with U.S. Appl. No. 11/772,445, mailed Mar. 5, 2010, 7 pages.

\* cited by examiner

BRACE SYSTEM AND METHOD FOR A VEHICLE AT A LOADING DOCK

BACKGROUND OF THE INVENTION

1. Field of the Invention

The subject invention generally pertains to equipment used at a vehicle loading dock and more specifically to a brace and an operational method that helps suppress the vehicle's vertical movement, augmenting the vehicle's suspension, as the vehicle is being loaded or unloaded of its freight.

2. Description of Related Art

A typical truck loading dock of a building includes an exterior doorway with an elevated platform for loading and unloading vehicles such as trucks and trailers. Many loading docks have a dock leveler to compensate for height differences between the loading dock platform and an adjacent bed of a cargo transport vehicle i.e. truck or trailer. A typical dock leveler includes a deck, also known as a ramp or dock board, which is pivotally hinged along its back edge to vary the height of its front edge. An extension plate, or lip, extends outward from the deck's front edge to span the gap between the rear of the trailer bed and the front edge of the deck. Extending from the deck's front edge, the lip rests upon the truck bed to form a bridge between the deck and the bed. This allows personnel and material handling equipment, such as a forklift truck, to readily move on and off the vehicle during loading and unloading operations.

When a forklift drives over the dock leveler and onto the trailer bed, the weight of the forklift and the cargo it may be carrying can add a significant load to the truck bed. Likewise, when the forklift exits the truck bed, weight is removed form the trailer. Thus, the load applied to the trailer changes repeatedly during the loading/unloading process. The trailer's suspension may respond to these load changes by allowing the trailer to raise and lower accordingly.

Unfortunately, the resulting vertical movement of the trailer may be excessive and can create some problems. For instance the rear or side edges of the trailer usually engage some type of dock seal that is mounted at a generally fixed location along the doorway of the dock, so excessive vertical movement of the trailer can prematurely wear out the seal. Also, a forklift suddenly descending upon entering the trailer can be disconcerting to the driver of the forklift. The problem becomes worse when the trailer has an air suspension system.

With air suspension, air-pressurized bladders support the weight of the trailer and its cargo. Air suspension systems typically include an air compressor, a holding tank, and various control valves that cooperate to add or release a controlled amount of air from the bladders to help maintain the trailer at a certain height. So, when a forklift enters the trailer, pressurized air is forced into the bladders to compensate for the forklift's added weight. Due to the suspension system's delayed response time, however, the trailer may initially sink when the forklift first enters and later rise back up toward its intended height as, or immediately after the forklift departs. Then, when the forklift leaves and removes its weight from the trailer, the recently added air in the bladders lifts the trailer above its designed height. The system compensates for the overshoot by then releasing some air from the bladders until the trailer settles back down to it original height. This down/up cycle of the trailer repeats itself with every load the forklift takes on or off the trailer. Compared to other suspension systems, air suspensions usually provide much greater vertical movement. And due to the mechanical linkage of typical air suspension systems, the vertical movement of the trailer is usually accompanied by a generally equal amount of horizontal movement as well.

To eliminate the repeated movement of the trailer, an air suspension system may have its air dumped or completely exhausted from the bladders before the loading or unloading process begins. This causes the trailer to descend until the suspension system bottoms out, whereby the suspension becomes inactive, and the trailer remains at its bottomed out position while the trailer is loaded or unloaded of its cargo. Although this may correct the problems associated with movement of the trailer during loading and unloading, the low position of the trailer bed can create another problem. For a dock leveler to reach such an extremely low trailer bed, the deck may need to be set at such a steep incline that it may be difficult for the forklift to travel across the deck. This problem sometimes can be corrected by utilizing a significantly longer dock leveler at a greater cost and forfeiture of valuable warehouse floor space.

Some loading docks may be provided with a vehicle restraint that helps prevent a truck or trailer from accidentally pulling away from the dock. Such vehicle restraints usually include a hook or barrier that reaches up in front of the vehicle's RIG (rear impact guard) or ICC bar. Examples of such vehicle restraints are disclosed in U.S. Pat. Nos. 6,488,464 and 6,431,819. Instead of obstructing vertical movement of the vehicle during its loading or unloading, these patented vehicle restraints do just the opposite, they accommodate or allow the vehicle the freedom to move vertically. The '819 patent, for instance, discloses a spring that compresses with any downward force that an ICC bar may exert. Similarly, the vehicle restraint of the '464 patent includes a pressure relief valve that can be set to hold the weight of the restraint itself, but the relief valve is not meant to impair the downward movement of the vehicle.

Conceivably a solid, immovable support structure, such as an hydraulic jack, could be placed underneath the ICC bar to completely eliminate any vertical movement of the vehicle or actually lift the vehicle; however, such a support structure could result in an excessive upward reactive force being applied to the ICC bar and the underside of the trailer bed to which the bar is attached. More specifically, if the trailer bed were held stationary, any added weight of cargo or the weight of a forklift entering the trailer would be transmitted through the ICC bar and to the frame, neither of which may be designed to sustain such loads. Thus, holding the trailer bed completely immovable could damage the ICC bar or other parts of the trailer.

Such solid vehicle support systems are known in the art. Examples include U.S. Pat. Nos. 2,637,454 and 6,065923, as well as Japanese patent abstract 6114930A. These systems however, appear to be dedicated purpose designs involving special construction of the loading dock and often only work with trailers designed and fabricated specifically to interact with such a support. Most of these applications are found where automated loading systems are employed, where precise alignment between the dock floor and the trailer floor is required, often involving lifting of the trailer prior to arresting vertical and sometimes horizontal mobility of the trailer and completely blocking the operation of the onboard trailer suspension system. None of these designs are intended to work with typical every day loading dock operations.

There is a need for a method and or apparatus that alleviates the problems created by a vehicle moving in response to being loaded or unloaded of its cargo, that can readily be installed in front of loading docks to interact with a broad range of cargo transport vehicles, without requiring modifications to the vehicles or special loading dock designs.

SUMMARY OF THE INVENTION

In some embodiments, a vehicle brace opposes at least some of the vertical movement of a vehicle at a loading dock including minimizing or inhibiting the vertical movement component.

In some embodiments, a vehicle brace substantially prevents downward movement of a vehicle for up to a maximum allowable downward force exerted by the vehicle.

In some embodiments, a vehicle brace substantially prevents downward movement of a vehicle for up to a maximum allowable downward force exerted by the vehicle and permits a controlled downward movement of the vehicle when the vehicle exerts a force that exceeds the maximum allowable force.

In some embodiments, a vehicle brace exerts an upward reactive force against a vehicle, wherein the upward reactive force increases with the downward force of the vehicle.

In some embodiments, a vehicle brace exerts an upward reactive force against a vehicle, wherein the reactive force's vertical component is greater that its horizontal component.

In some embodiments, a vehicle brace includes a pressure relief valve that enables the vehicle brace to prevent downward movement of a vehicle for up to a certain downward force exerted by the vehicle.

In some embodiments, a vehicle brace includes a pressure relief valve that enables the vehicle brace to prevent downward movement of a vehicle for up to a maximum allowable downward force exerted by the vehicle and to permit a controlled downward movement of the vehicle when the vehicle exerts a downward force that exceeds the maximum allowable.

In some embodiments, a vehicle brace includes a flow restrictor that enables the vehicle brace to exert an upward reactive force against a vehicle, wherein the reactive force increases with the downward force of the vehicle.

In some embodiments, a vehicle brace includes a flow restrictor and a bypass valve that enable the vehicle brace to move more freely upward that downward.

In some embodiments, a vehicle brace is responsive to a sensor that determines whether a forklift or other body has or is about to enter the vehicle.

In some embodiments, a vehicle brace includes a brake that enables the vehicle brace to oppose the vertical movement of a vehicle at a loading dock.

In some embodiments, a vehicle brace includes a spring that enable the vehicle brace to oppose the vertical movement of a vehicle at a loading dock.

In some embodiments, a vehicle brace engages a vehicles rear impact guard to oppose the vertical movement of the vehicle at a loading dock.

In some embodiments, a vehicle brace minimizes deflection of the vehicle by augmenting the operation of the vehicle's suspension.

In some embodiments a vehicle brace is used in combination with a leveling device, as vertical deflection is minimized but not eliminated.

In some embodiments, a vehicle brace is provided which can be installed without the need for modification of an existing loading dock—such as by mounting to the face or an existing dock face, or to the driveway.

In some embodiments, a vehicle brace for exerting an upward reactive force against a vehicle is combined with a vehicle restraint that helps prevent the vehicle from accidentally pulling away from a loading dock.

DESCRIPTION OF THE PREFERRED EMBODIMENT

For a cargo transport vehicle such as a truck or trailer parked at a loading dock, various embodiments of vehicle braces can be used to help hold the rear edge of the vehicle steady (particularly in the vertical direction) as the vehicle is being loaded or unloaded of it cargo, through augmentation of the vehicle's onboard suspension system. Although various vehicle braces will be described, each of the braces includes a support member that is movable to a preparatory position where the support member can provide an upward reactive force against the vehicle in reaction to a downward force exerted by the vehicle against the support member. In some embodiments a control system moves the support member to it preparatory position, and in other cases, it is the vehicle itself that moves the support member into position.

Once in the preparatory position, the magnitude of the reactive force exerted by the support member upward against the vehicle can depend on the particular embodiment of the vehicle brace. In some cases, the reactive force is substantially equal and opposite that of the downward force exerted by the vehicle against the support member, whereby the vehicle is held substantially stationary provided the downward force is no greater than a certain limit. When operating beyond that limit, in some cases the support member provides a generally constant reactive force that opposes but is less than the downward force exerted by the vehicle, and in other cases, the reactive force increases with an increase in the downward force or the downward velocity of the vehicle. In either case, the reactive force slows the descent of the vehicle, regardless of whether the reactive force is constant or variable.

Figure 1:
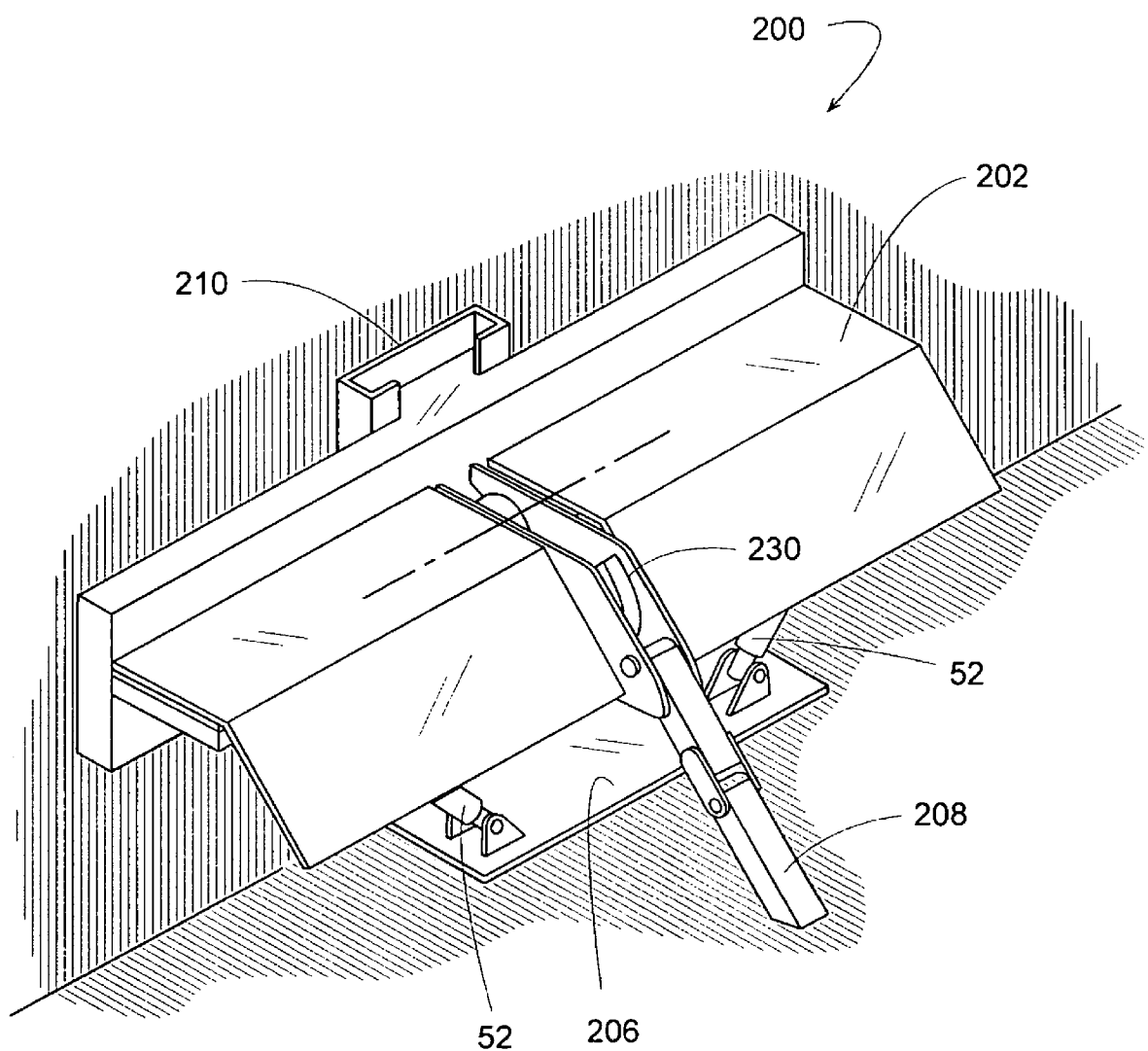
FIG. 1 is a perspective view of one embodiment of a vehicle brace installed at a loading dock.
Figure 2:
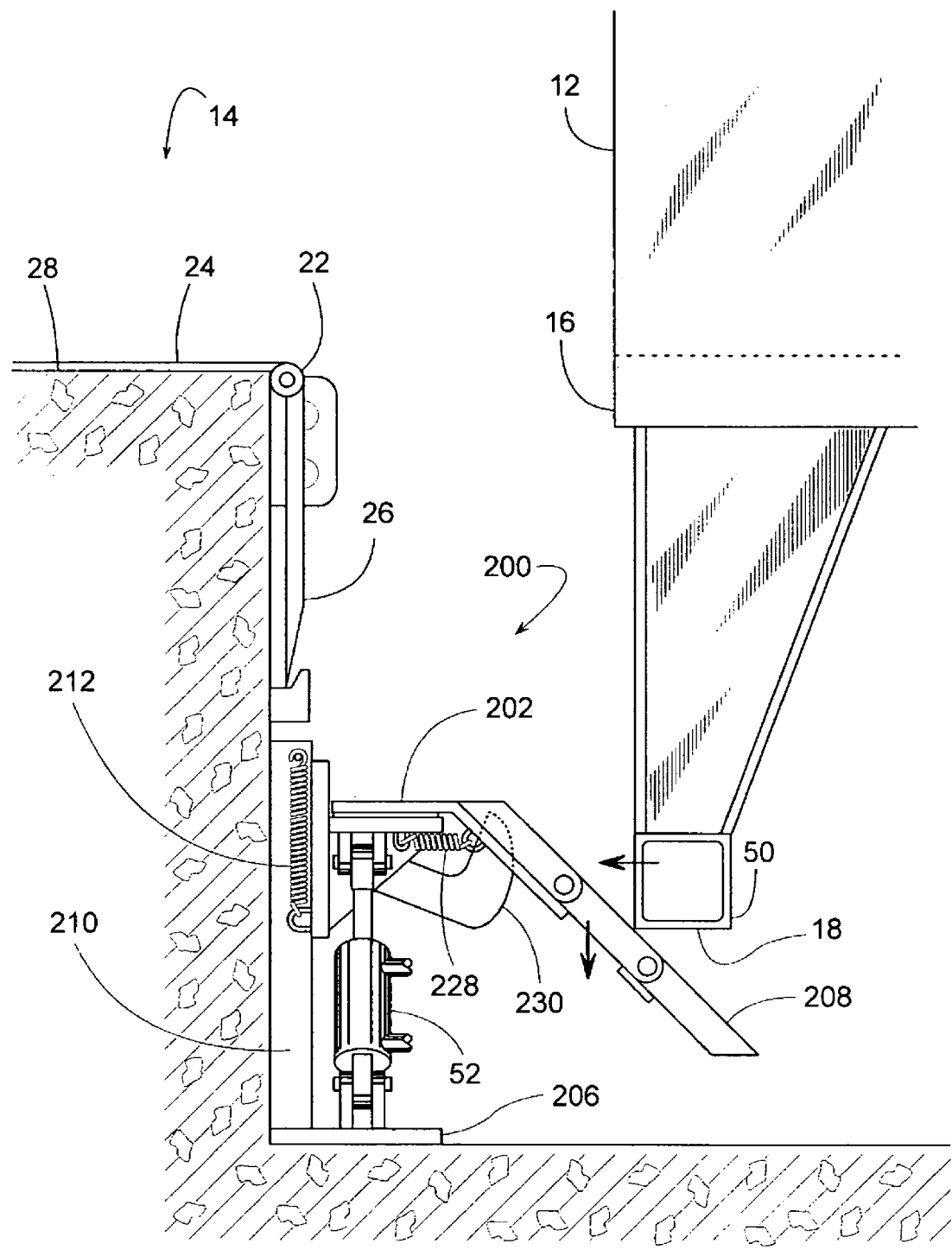
FIG. 2 is a side view of the vehicle brace for FIG. 1, wherein a vehicle is shown backing into the brace to move the brace's support member to a preparatory position.
Figure 3:
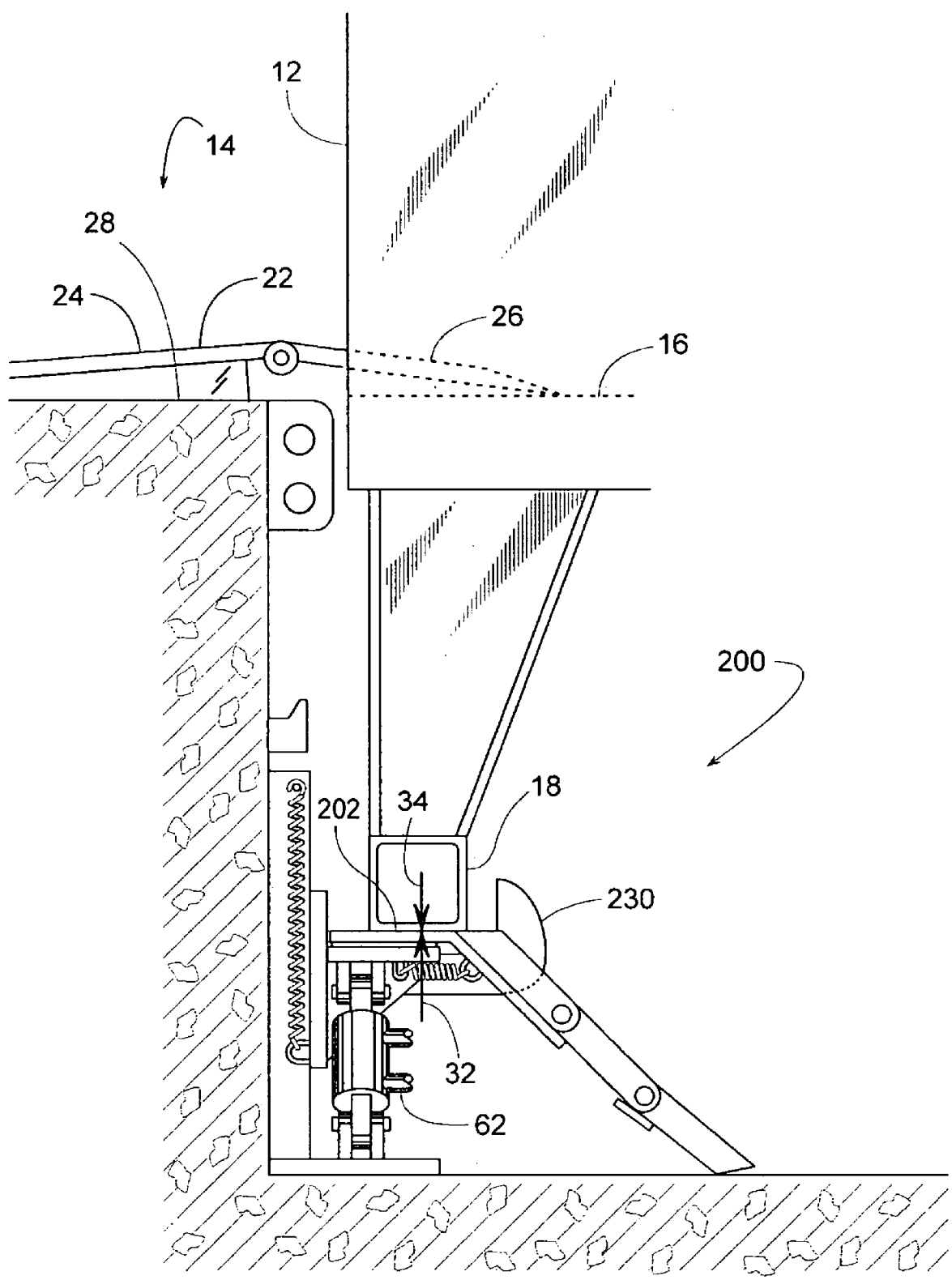
FIG. 3 is a side view similar to FIG. 2 but showing the brace's support member at a preparatory position and showing a dock leveler's lip extended into the rear of a vehicle.
Figure 4:
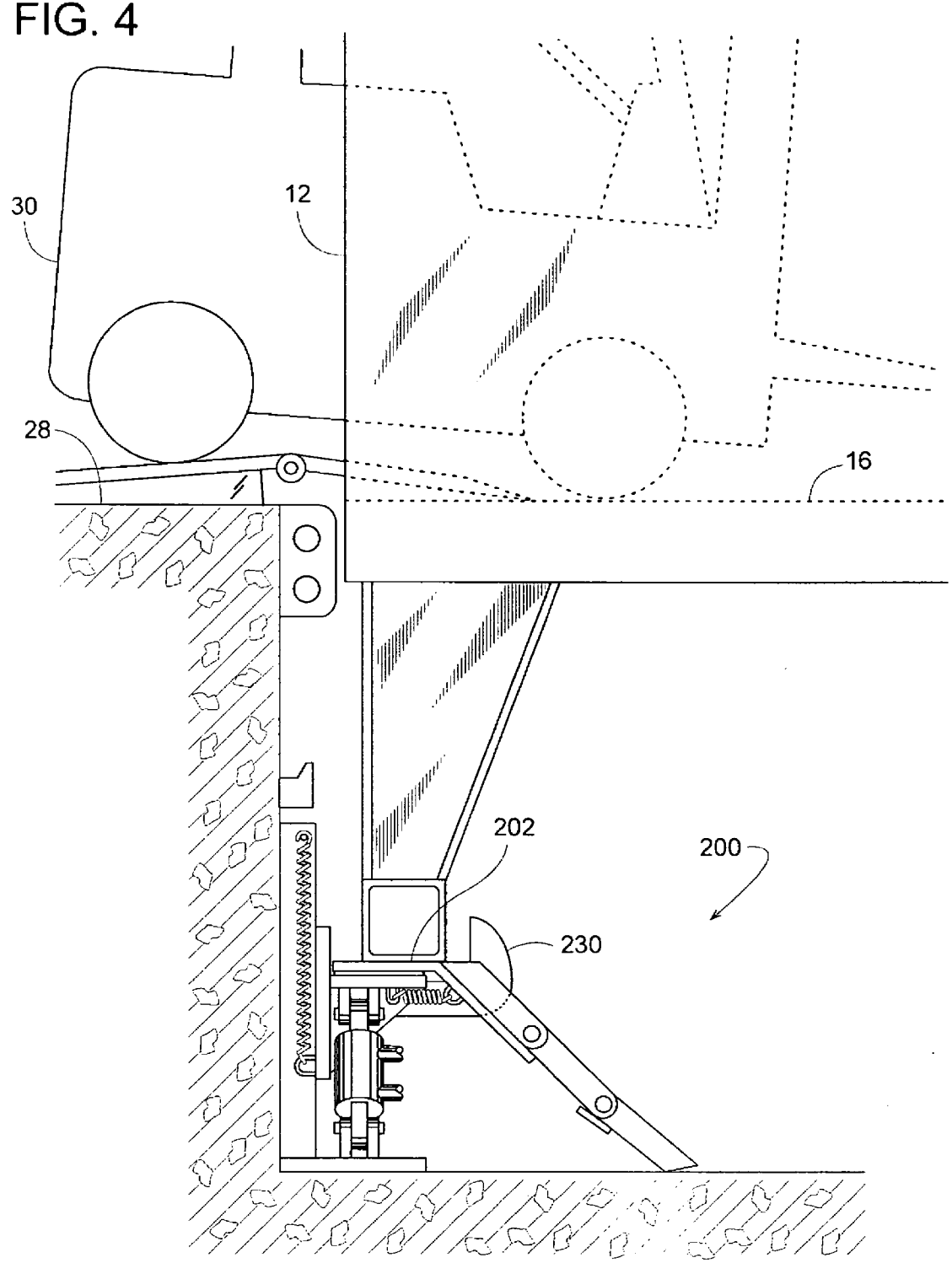
FIG. 4 is similar to FIG. 3 but showing a forklift traveling over the dock leveler to enter or exit the vehicle's trailer bed.
Figure 5:
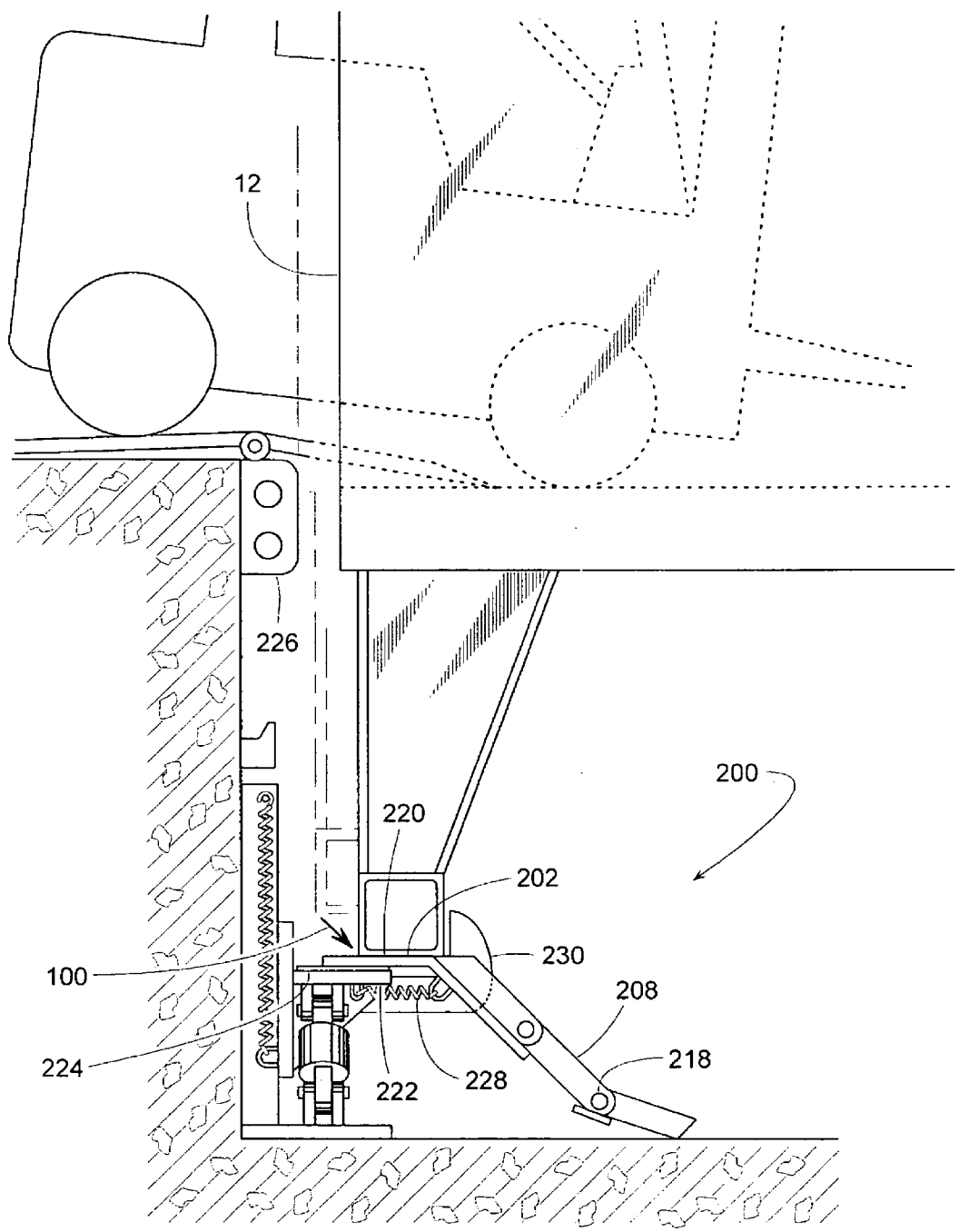
FIG. 5 is similar to FIG. 4 but showing how the weight of the forklift forces the vehicle downward.
Figure 6:
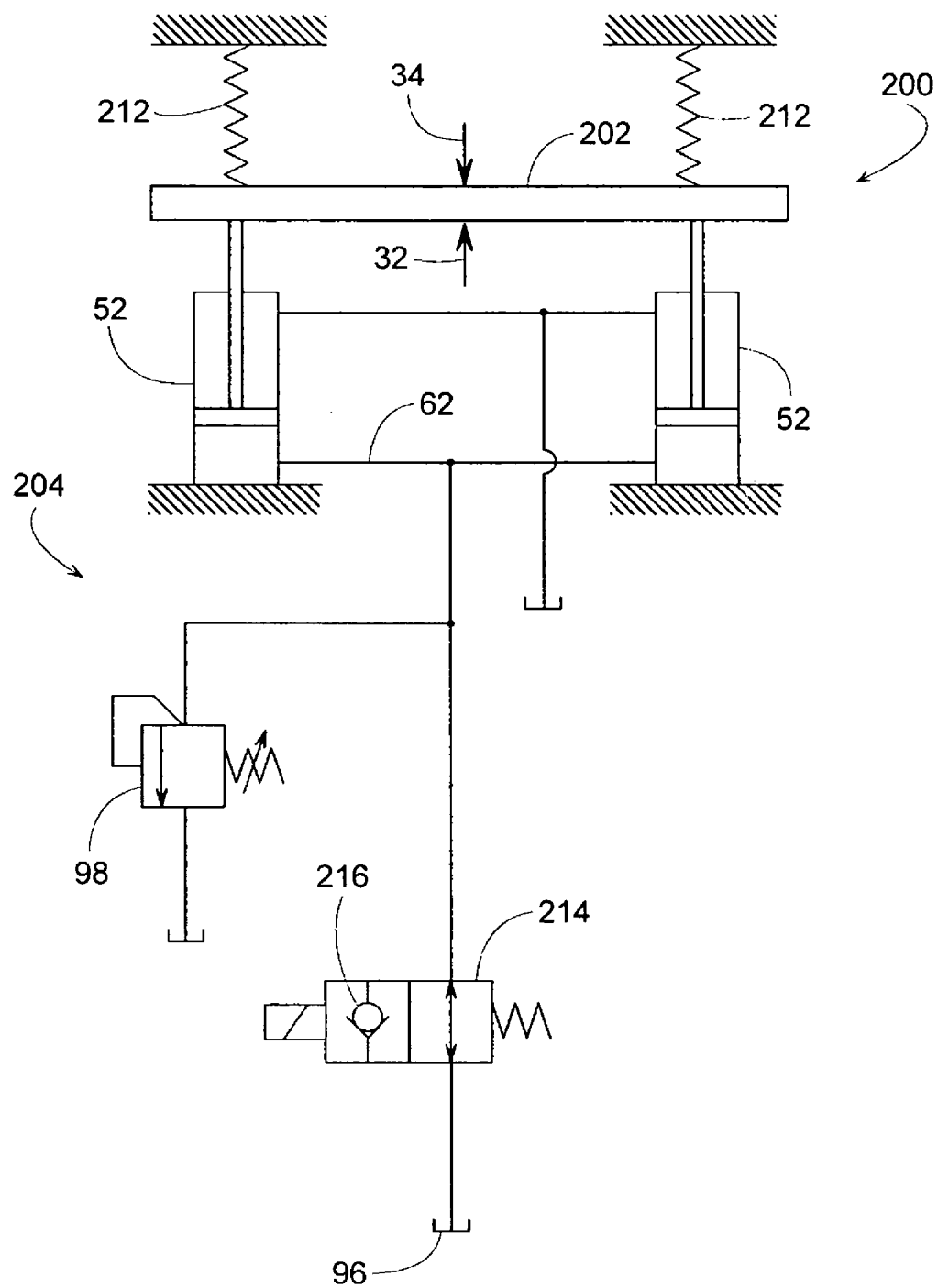
FIG. 6 is a schematic diagram of a hydraulic circuit that can control the vehicle brace of FIG. 1.

The first embodiment of a vehicle brace 200 for steadying a vehicle 13 at a loading dock is shown in FIGS. 1-6. FIG. 1 is a perspective view, FIG. 6 is a schematic view, and FIGS. 2-5 are side views of vehicle brace 200 under various operating conditions. The term, "vehicle" represents any wheeled cargo carrier including, but not limited to, a truck or trailer. To help restrict downward movement of vehicle 12, a support member 202 of brace 200 is shown in FIGS. 3-5 engaging the vehicle's rear edge, which actually encompasses any part of vehicle 12 including, but not limited to, a lower back surface of a trailer bed 16 or a rear impact guard such as an ICC bar 18.

For brace 200, it is the movement of vehicle 12 backing into dock 14 that moves support member 202 from its raised, stored position of FIG. 2 to a preparatory position of FIG. 3. Once in the preparatory position, a control system 204 of FIG. 6 enables support member 202 to exert a reactive force 32 that is equal and opposite to a downward force 34 exerted by vehicle 12 so that support member 202 remains substantially stationary at its preparatory position until force 34 exceeds a predetermined maximum allowable force. If force 34 exceeds the maximum allowable force, then the downward force 34 overcomes reactive force 32, which causes brace 200 to yield by allowing support member 202 to descend. While descending, support member 202 may still exert a generally constant reactive force 32 that, although it is less that downward force 34, is sufficient to appreciably or noticeably slow the descent of support member 202 and the position of vehicle 12 resting thereon. Below the maximum allowable force, support member 202 of brace 200 helps hold the rear end of vehicle 12 at a generally fixed height, and above the maximum allowable force, brace 200 yields to slow the descent of vehicle 12 and prevent reactive force 32 from bending or otherwise damaging bar 18 or other parts of vehicle 12. That ism the maximum allowable force may be chosen to be a force level below which damage to the vehicle will not occur, based on the design parameters of the vehicle frame.

In some embodiments of brace 200, vehicle brace 200 comprises a base plate 206 anchored to the floor of loading dock 14, an articulated guide 208 attached to support member 202, and a track 210 attached to a vertical wall of loading dock 14 for guiding the movement of support member 202. To enable support member 202 to exert reactive force 32, the control system 204 of brace 200 includes one or more piston/cylinders 52 that have an upper end coupled to support member 202 and a lower end connected to base plate 206. A biasing element depicted as tension spring 211 urges support member 202 up toward its stored position of FIGS. 1 and 2.

Referring to FIG. 2, operation may begin with vehicle 12 backing into dock 14. As vehicle 12 travels back, bar 18, or some other surface of vehicle 12, engages guide 208, which provides a wedge or cam action that pushes support member 202 down in opposition to the urging of spring 212 until bar 18 rides over the top of support member 202. As vehicle 12 pushes support member 202 down to its preparatory position, piston/cylinders 52 are free to retract because a de-energized solenoid valve 214 of FIG. 6 vents the piston side of the cylinders to a tank 96.

Next, FIG. 3 shows bar 18 atop support member 202, and a dock leveler 22 is shown with is ramp 24 raised and lip 26 extended to provide a bridge from a platform 28 of dock 14 to a trailer bed 16 of vehicle 12. This creates a path for a forklift 30 and/or other material handling equipment to move cargo between vehicle 12 and platform 28 as shown in FIG. 4. Since brace 200 is intended to allow vertical movement of vehicle 12 (for applied forces above the maximum allowable) its use in combination with a leveling device such as dock leveler 22 may be advantageous. In situations where an always-rigid brace is used, the bridge plate between the loading dock and the vehicle will not change in orientation, as it is suspended between fixed surfaces. Here, however, the vehicle may move vertically, so the bridge plate may be vertically adjustably mounted to the loading dock to accommodate such movement. It will be appreciated that a conventional dock leveler— comprising a pivotally-mounted main deck structure in the loading dock floor and a front-mounted lip structure that bridges the gap from the deck to the vehicle bed will provide a wide range of vertical adjustability (to match vertical movement of the vehicle) while still maintaining a minimal grade so as to allow the fork truck to travel over it. Other leveling devices that do not have the horizontal length of a deck/lip style dock leveler may not provide the same vertical service range while maintaining a small enough grade to allow fork truck operation.

To help hold the rear end of vehicle 12 steady as forklift 30 moves on and off of trailer bed 16, solenoid valve 214 of FIG. 6 is energized. This places a check valve 216 between a tank 96 and the piston side of cylinders 52. When forklift 30 or other weight urges vehicle down, check valve 216 prevent support member 202 from descending; however, check 216 allows support member 202 to follow any upward movement of vehicle 12.

If excessive weight added to trailer bed 16 creates a force 34 that exceeds the predetermined maximum allowable force, then a pressure relief valve 98 is preset to release excess pressure in line 62 to tank 96. This limits the pressure in line 62 to create a maximum allowable reactive force 32 that slows the descent of vehicle 12. Thus, support member 202 augments the operation of the vehicle's suspension system by preventing vehicle 12 from descending up to the maximum allowable force limit. Beyond the maximum allowable limit, brace 200 yields, but support member 202 continues to augment the vehicle's suspension by exerting a generally constant upward reactive force 32 that slows the descent of vehicle 12.

As vehicle 12 descends, in some cases, the vehicle may also move horizontally due to the design of the vehicle's suspension system. The vehicle's vertical and horizontal movement is depicted by arrow 100 of FIG. 5. In some cases, guide 208 may include a pivotal joint 218 that prevents the downward movement of vehicle 12 from bending or crushing guide 208. To accommodate the horizontal movement of vehicle 12, support member 202 may comprise an upper weight-bearing member 220, a lower weight-bearing member 222, and an anti-friction element 224 there between. Upper member 220 is installed to slide horizontally relative to lower member 222, and element 224 minimizes the friction between members 220 and 222. The reduced friction helps prevent vehicle 12 from dragging bar 18 across upper member 20, which thus helps prevent damaging wear or bending forces from developing between bar 18 and upper member 220. Given that the brace is not intended to prevent all vertical movement of vehicle 12, and given that the design of the vehicle's suspension typically creates horizontal movement that is linearly proportional to any vertical movement, this accommodation of horizontal movement may be desirable to prevent significant stress in the vehicle once vertical deflection has occurred. When vehicle 12 moves toward bumper 236 or completely departs dock 14, a spring 238 can urge upper member 220 back to it starting position directly above lower member 222.

To help prevent vehicle 12 from accidentally or prematurely pulling away from dock 14, vehicle brace 200 can be provided with a fixed or movable hook 230 (e.g., pivotal) or some other type of vehicle restraining member. Hook 230, for example, can be selectively driven between a retracted position, as shown in FIGS. 1 and 2, and a vehicle-restraining position as shown in FIG. 3-5. Further structural and functional details of hook 230 as well as guide 208 can be found in U.S. Pat. No. 6,116,839, which is specifically incorporated by reference herein.

Figure 7:
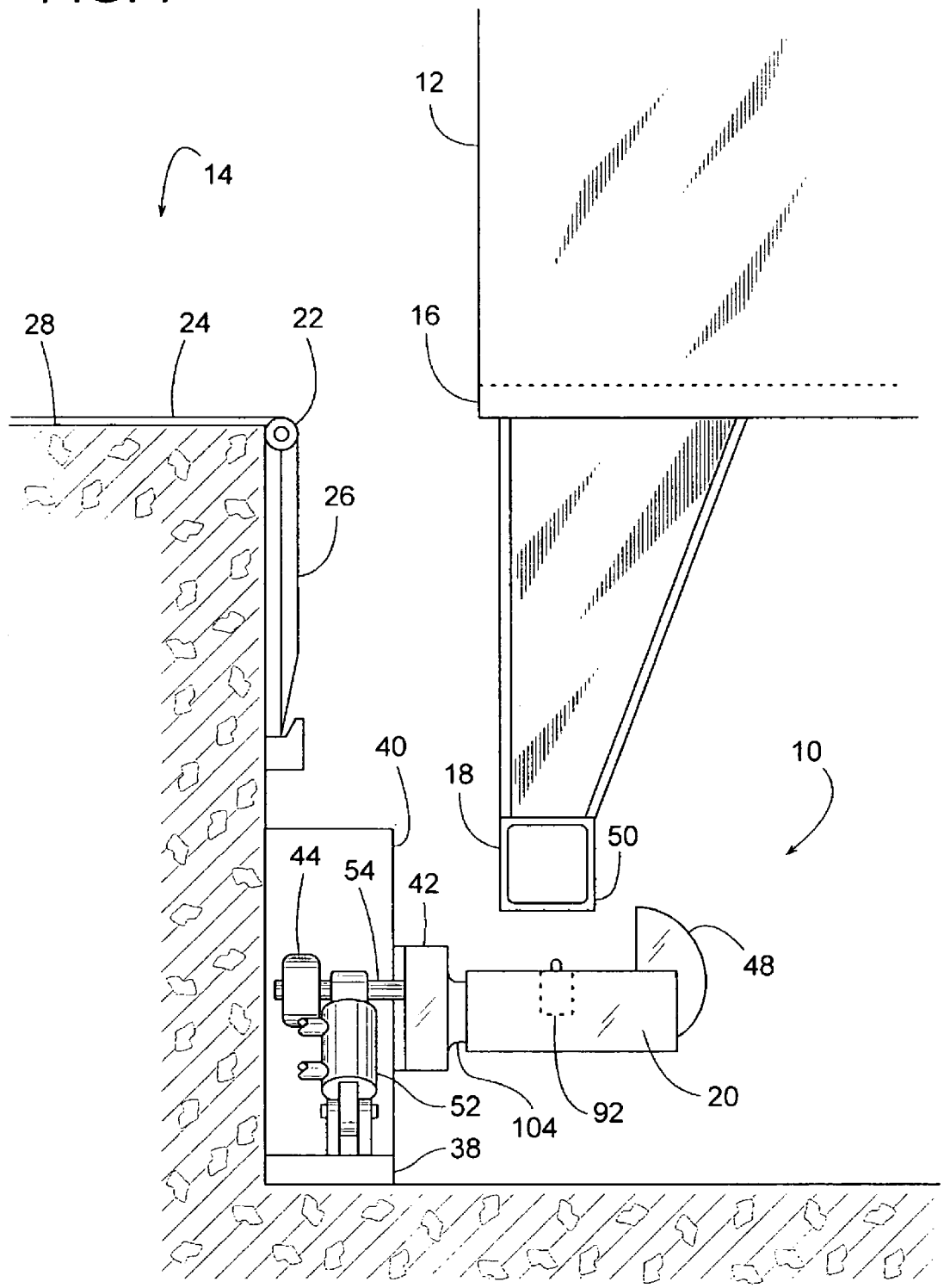
FIG. 7 is a side view of another vehicle brace and showing a vehicle having backed its rear impact guard over a support member of the brace.

As an alternative to having springs 212 raise support member 202, FIGS. 7-13 show a vehicle brace 10 with a support member 20 that is powered up. With brace 10, a control system 36 of FIG. 13 can raise support member 20 from it stored position of FIG. 7 to its preparatory/operative position of FIG. 8. The stored position allows vehicle 12 to back into dock 14, so bar 18 can be positioned over vertical support member 20 as shown in FIG. 7.

Figure 8:
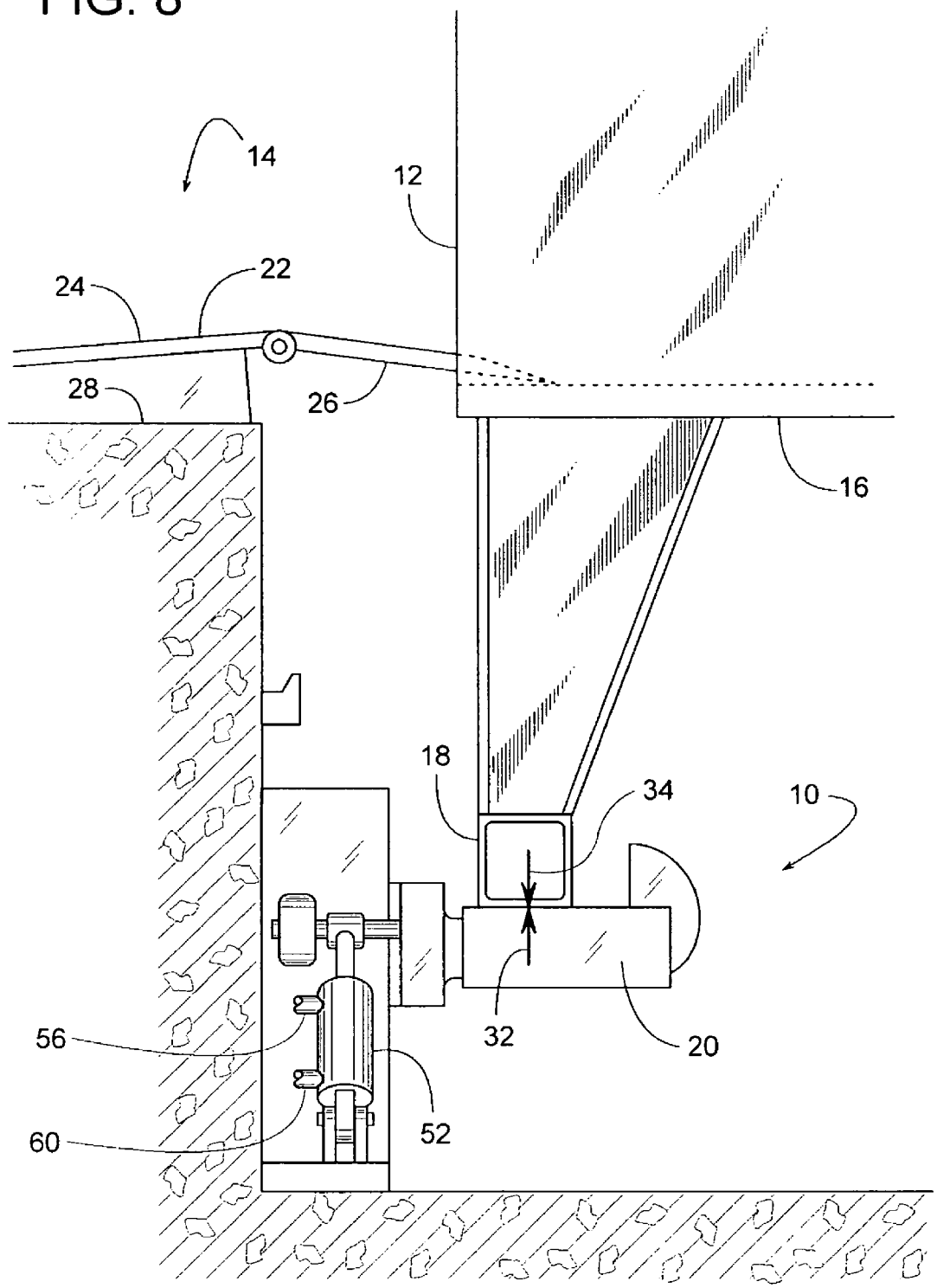
FIG. 8 is a side view of the vehicle brace of FIG. 7 but showing the brace in a preparatory position.

After vehicle 12 backs into dock 14, dock leveler 22 raises its ramp 24 and extends its lip 26 to provide a bridge from platform 28 of dock 14 to trailer bed 16 of Vehicle 12, support member 20 is raised as shown in FIG. 8. It should be noted that the sequence of raising support member 20 and placing lip 26 on trailer bed 16 could be reversed.

Vehicle brace 10 comprises a base plate 38 and a track 40 that are attached to dock 14. A carriage 42 is mounted for vertical travel along track 40. In some cases, rollers 44 can help reduce friction between carriage 42 and track 40. Carriage 42 may include flanges 46 that help prevent the carriage from being pulled horizontally out from within track 40. Carriage 42 provides structure for supporting one or more vertical support members 20 and an optional hook 48. Hook 48 represents any structure that can engage a front edge 50 of bar 18 to help prevent vehicle 12 from accidentally pulling away from dock 14.

In the illustrated embodiment, hook 48 is fixed relative to carriage 42. To obstruct or release bar 18, carriage 42 respectively rises and descends to move hook 48 accordingly. In other embodiments, however, hook 48 can pivot or otherwise move relative to carriage 42, so hook 48 can selectively obstruct or release bar 18 without carriage 42 necessarily having to move along track 40.

To move carriage 42, one or more hydraulic cylinders 52 (a piston/cylinder) are installed between carriage 42 and plate 38. Cylinders 52 actually represent any actuator capable of moving carriage 42 up or down. Such an actuator could conceivably be installed in any appropriate orientation or configuration and function under any suitable principal of operation. Examples of such and actuator include, but are not limited to, a gas filled piston/cylinder, a liquid filled piston/cylinder, rod less cylinder, spring-return piston/cylinder, vehicle-operated actuator, linear motor, chain and sprocket, rack and pinion, winch, electric motor, hydraulic motor, air powered motor, pressurized fluid filled bladder, spring, etc.

For the illustrated embodiment, cylinders 52 have a lower end pinned to base plate 38 and have an upper end pinned to a shaft 54. Shaft 54 can be an axle for a roller, as shown, or can be a separate item for just cylinders 52. Cylinders 52 extend to raise carriage 42, with hook 48 and vertical support members 20. Control system 36 of FIG. 13 can be used to control the operation of cylinders 52.

Each cylinder 52 has one port 56 connected to a hydraulic line 58 of system 36 and a second port 60 connected to a line 62. The hydraulic pressure in lines 58 and 62 determine the action of cylinders 52. A hydraulic pump 64 provides system 36 with hydraulic pressure in a conventional manner. Pump 64, for instance, can be cycled on and off as needed, or the pump can be associated with an appropriate system relief valve, and/or pump 64 could be a variable capacity pump. Regardless, pump 64 supplies pressurized hydraulic fluid at a discharge line 68.

To lift support member 20 to its operative position up against bar 18, a two-position four-way valve 86 is de-energized to convey the pressure in line 68 to line 62 and the piston side of cylinders 52. Support member 20 raises until a limit switch 92 is in contact with bar 18, which de-energizes pump 64. A relief valve 66 is set to provide pressure in line 68 only in the amount needed for raising the weight of carriage 42 and support member 20. A check valve 232 prevents support member 20 from being readily pushed back down. However, if force 34 reaches a predetermined maximum allowable limit, a second pressure relief valve 98 is preset to release the excess pressure in line 62 to tank 96. Thus, support member 20 augments the suspension on vehicle 12 by preventing vehicle 12 from descending up to the maximum allowable force limit as determined by the setting of relief valve 98. Beyond the maximum allowable limit, brace 10 yields, but support member 20 still exerts a generally constant upward reactive force 32 determined by pressure relief valve 98, that slows the descent of vehicle 12.

In some cases, particularly with air suspension systems, trailer bed 16 will move about one inch horizontally away from dock 14 for every one inch of downward movement. This movement is depicted by arrow 100 of FIG. 10. To advantageously accommodate the horizontal movement, each vertical support member 20 may comprise a spring-loaded sleeve 102 that slides over a support beam 104. As bar 18 moves horizontally away from dock 14, bar 18 forces sleeve 102 to move along with it, thereby minimizing wear between bar 18 and support member 20 and perhaps preventing bending of bar 18. Installing a wear pad, linear bearing or other anti-friction member between sleeve 102 and support beam 104 can reduce wear between sleeve 102 and support beam 104. When bar 18 lifts away from support member 20 or when bar 18 moves toward carriage 42, a spring 106 draws sleeve 102 back over support beam 104.

An advantage of vehicle braces 10 and 200, when controlled as just described, is that braces 10 and 200 each help hold vehicle 12 substantially still over a broad range of forces 34. Force 34, however, may accumulate gradually as forklift 30 continues to deliver cargo into vehicle 12, so eventually the accumulated weight of the cargo may exceed the maximum allowable force 34, which can cause support member 20 to descend significantly in response to just a small incremental load being placed in vehicle 12. To address this concern, it may be desirable, in some cases, to have a vehicle brace that controllably yields to incremental loads as they occur or shortly thereafter.

Figure 9:
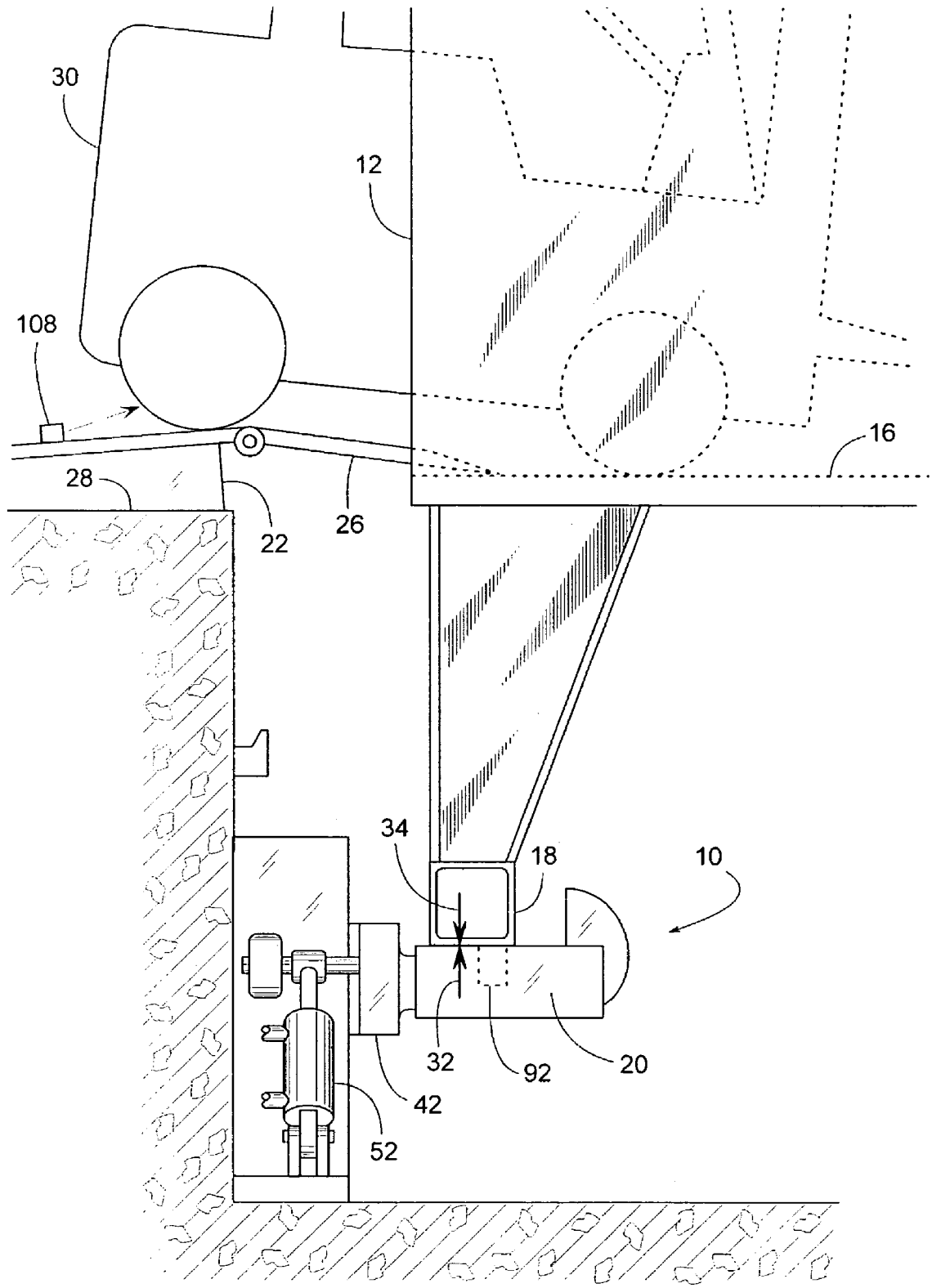
FIG. 9 is a side view similar to FIG. 8 but showing a forklift traveling over a dock leveler to enter or exit the vehicle's trailer bed.
Figure 10:
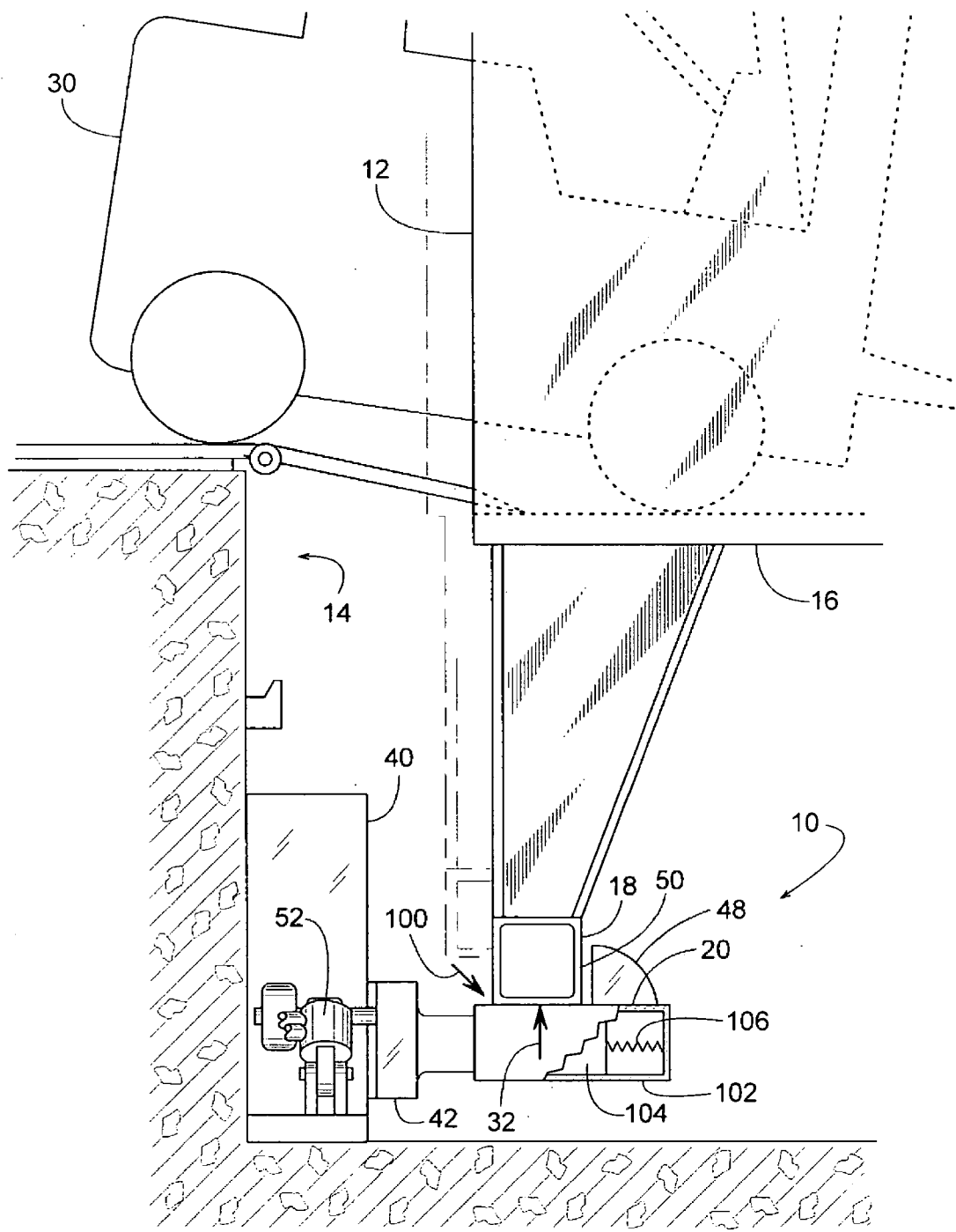
FIG. 10 is a side view similar to FIG. 9 but the figure also shows a partial cutaway of the brace's support member to illustrate how the brace responds to movement of the trailer bed.
Figure 11:
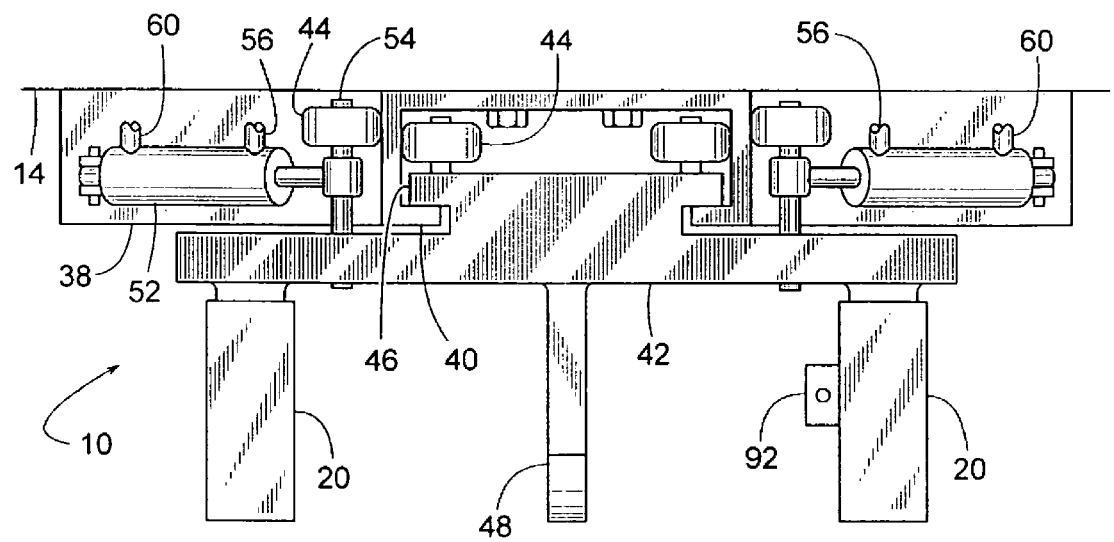
FIG. 11 is a top view of the vehicle brace of FIG. 7.
Figure 12:
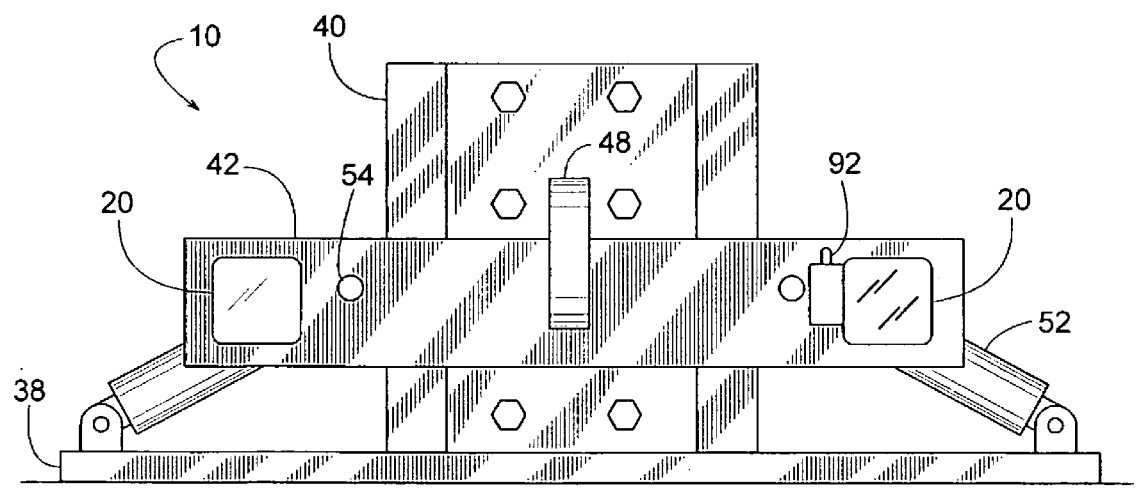
FIG. 12 is a front view of the vehicle brace of FIG. 7.
Figure 13:
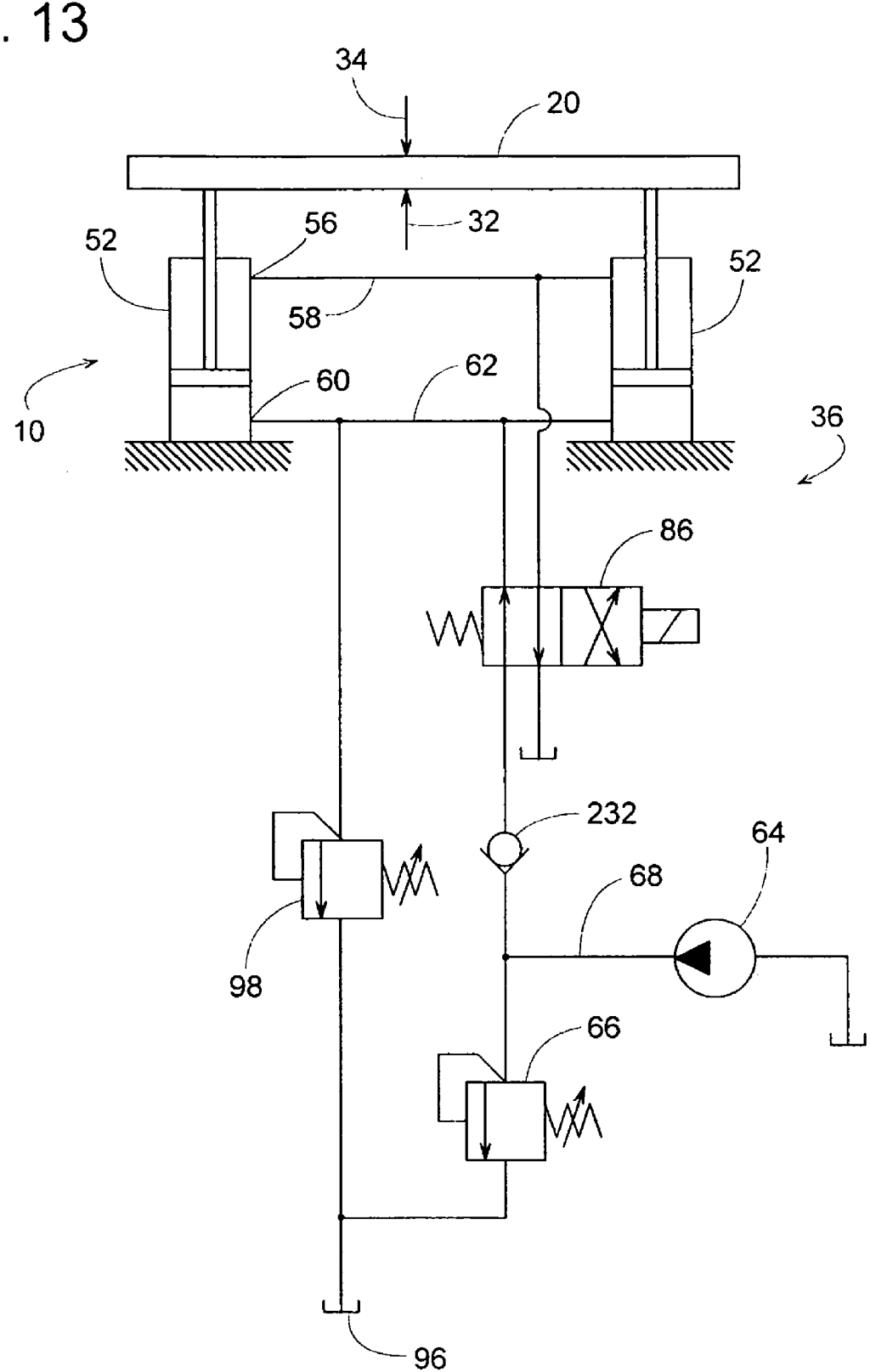
FIG. 13 is a schematic diagram of a hydraulic circuit for controlling the vehicle brace of FIG. 7.
Figure 14:
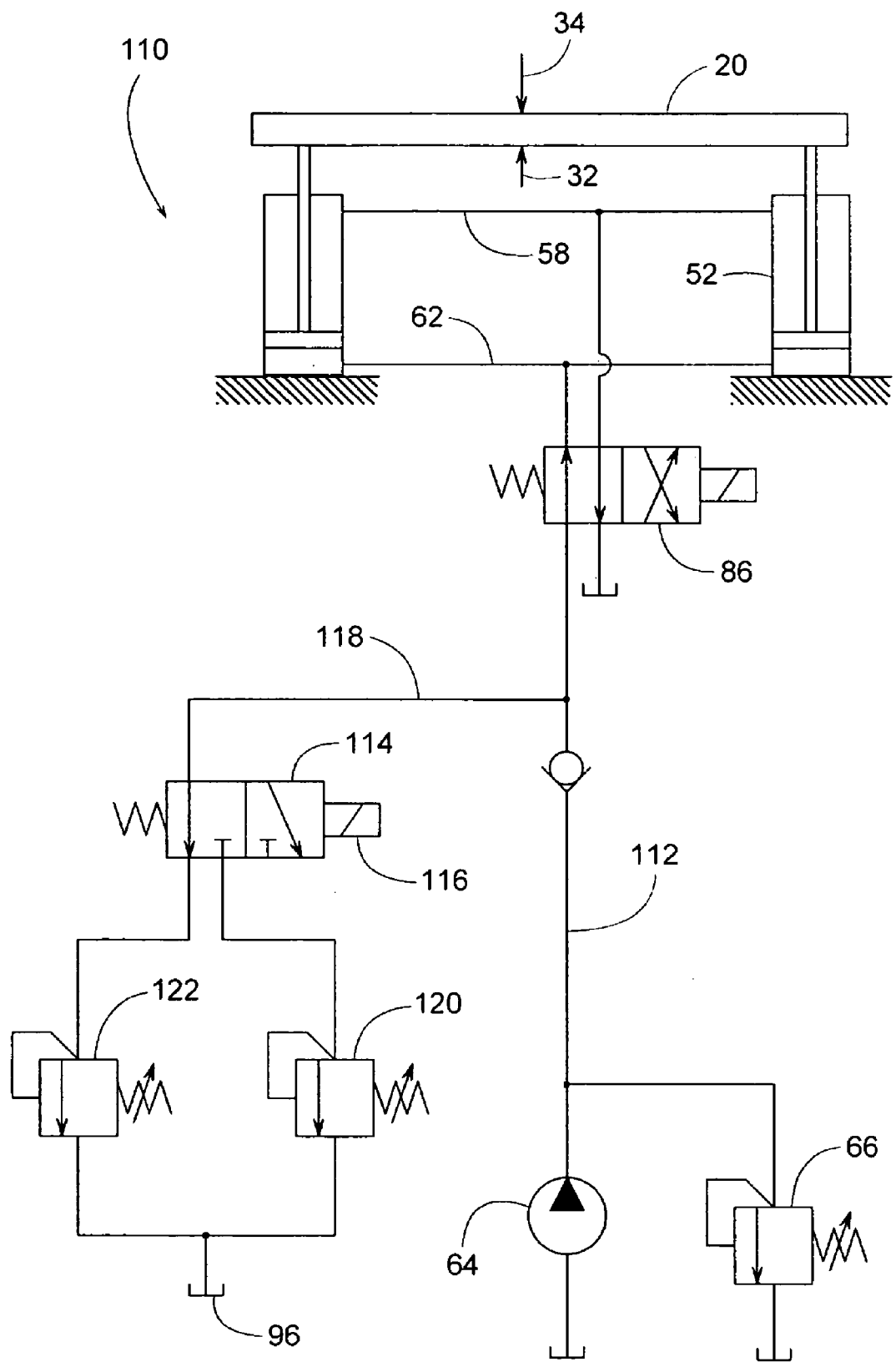
FIG. 14 is a schematic diagram of another hydraulic circuit for controlling the vehicle brace of FIG. 7.

For example, the control of vehicle brace 10 may be responsive to a load sensor 108 as shown in FIG. 9. Load sensor 108 is schematically illustrated to represent any device that senses when weight is being added/removed or is about to be added/removed to or from vehicle 12. Examples of sensor 108 include, but are not limited to, a proximity switch; a photoelectric eye; a switch responsive to strain or movement of dock lever 22, carriage 42, or trailer bed 16; motion detector; infrared detector; an antenna sensing an electromagnetic field; strain gage; load cell, etc. In response to sensor 108, a control system 110 provides pressurized hydraulic fluid to a hydraulic line 112, and a three-way spring return solenoid valve 114 responds to sensor 108 to determine the reactive force 32 that support member 20 is able to exert against bar 18.

In operation, a solenoid 116 of valve 114 is energized when sensor 108 detects that a forklift is about to drive onto trailer bed 16. This places a line 118 of system 110 in fluid communication with a higher-pressure relief valve 120 that is set to only pass hydraulic fluid to tank 96 when downward force 34 exceeds a certain maximum allowable limit, such as 10 tons. Thus, support member 20 augments the vehicle's on-board suspension by holding trailer bed 16 substantially rigid unless excessive downward force is applied to support members 20. When sensor 108 determines that forklift 30 has left trailer bed 16 system 110 responds by de-energizing solenoid 116. This places line 118 in fluid communication with a lower-pressure relief valve 122 set to hold just enough pressure in line 62 to support the movable weight of vehicle brace 10. Valve 122 allows trailer bed 16 to settle to a new lower elevation in reaction to the trailer bed having just received a load from the recently departed forklift. Solenoid valve 114 is repeatedly energized and de-energized as the forklift continues to deliver loads to the trailer bed. The repeated cycling of valve 114 allows the trailer to adjust downward in reaction to cargo being added and thus relieves the brace from having to itself support this added cargo weight. Since any lowering of the trailer bed occurs when the forklift is on the dock, the driver of the forklift does not experience the unsettling feeling of suddenly dropping upon entering the trailer bed.

When forklift 30 is unloading cargo from vehicle 12, the trailer bed may rise with every load that is removed. System 110 allows support member 20 to follow the upward movement of bar 18 in a manner similar to that of control system 36 of FIG. 13.

When vehicle is ready to depart, valve 86 is actuated to lower support member 20.

Figure 15:
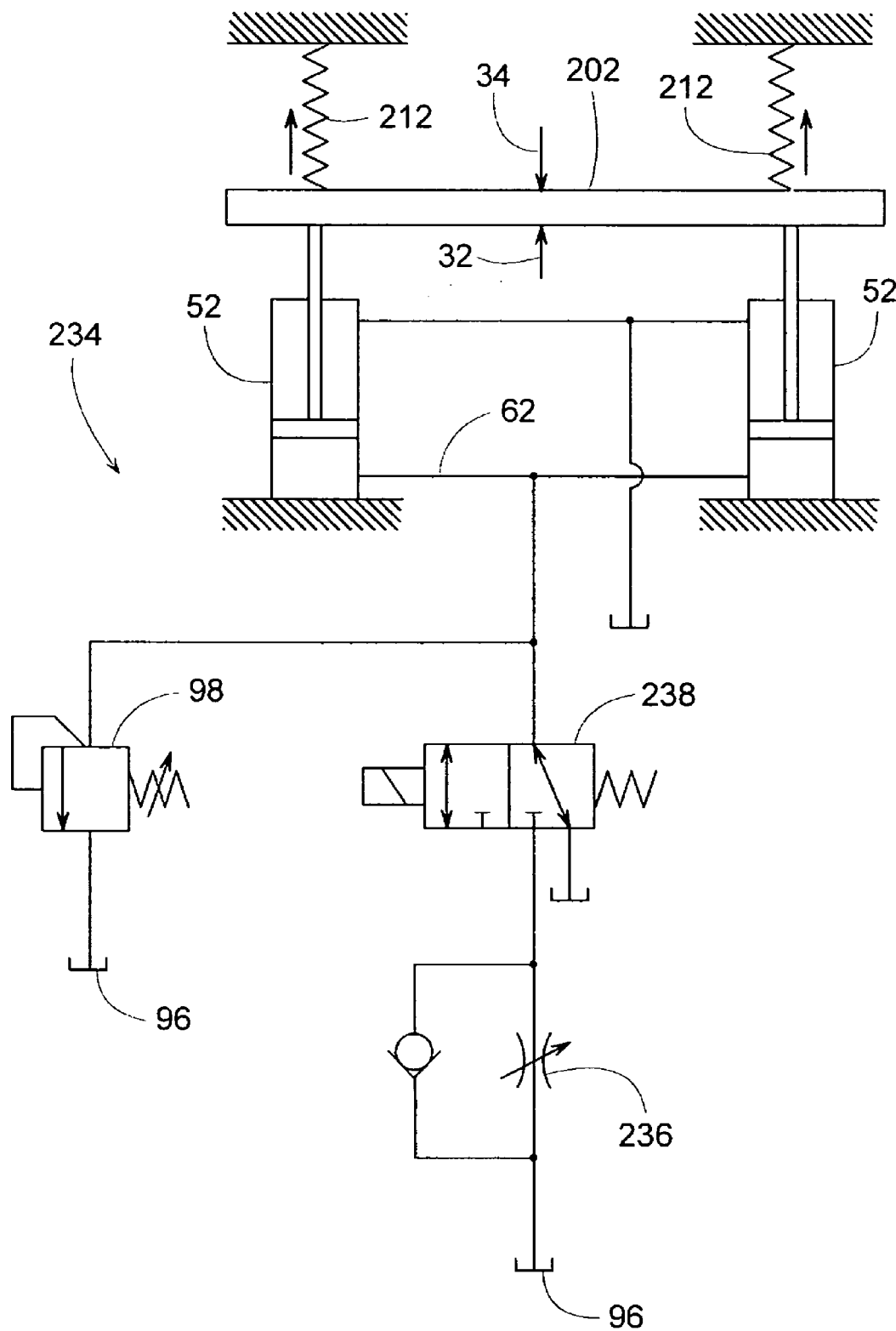
FIG. 15 is a schematic diagram of a hydraulic circuit for controlling the vehicle brace of FIG. 1.

Although load sensor 108 and control system 110 enable a vehicle brace to respond to incremental loads as they occur, or shortly thereafter, another control system 234 addresses that same issue by using a flow restriction such as orifice 236 of FIG. 15. Control system 234 can control vehicle brace 200 of FIGS. 1-5 in a manner that will now be described.

De-energizing a two-position, three-way solenoid valve 238 enables springs 211 to bias support member 202 up to its stored position of FIGS. 1 and 2. De-energizing valve 238 also allows vehicle 12 to back its bar 18 over support member 202 until member 18 is at its preparatory operative position of FIG. 3. Valve 238 is then energized to place line 62 and the piston of cylinders 52 in fluid communication with tank 96 via orifice 236. As force 34 increases, due to weight being added to trailer bed 16, the force pushes support member 202 down, which forces cylinders 52 to retract, which in turn forces fluid to flow through orifice 236. The resulting pressure differential developed across orifice 236 increases with the amount of flow. So, the pressure in line 62 and thus the reactive force 32 that support member 202 applies against bar 18 increases with increased flow through orifice 236, which is a function of the force being applied to member 202 by the vehicle. If force 34 exceeds a maximum allowable force determined by the relief setting of relief valve 98, then relief valve 98 opens to release the excess pressure in line 62 to tank 96. When relief valve 98 opens, a generally constant pressure is maintained in line 62 and the piston side of cylinders 52. This causes support member 202 to exert a generally constant upward reactive force 32 that slows the descent of bar 18.

Thus, when vehicle brace 200 is controlled by system 234, support member 202 augments the vehicle's on-board suspension to minimize vertical deflection by opposing the downward force 34 with a reactive force 32 that increases with the downward force 34 or the downward velocity of bar 18 but does so only up to a predetermined maximum allowable force. When downward force 34 exceeds the maximum allowable limit, reactive force 32 is generally constant to slow the descent of bar 18.

Figure 16:
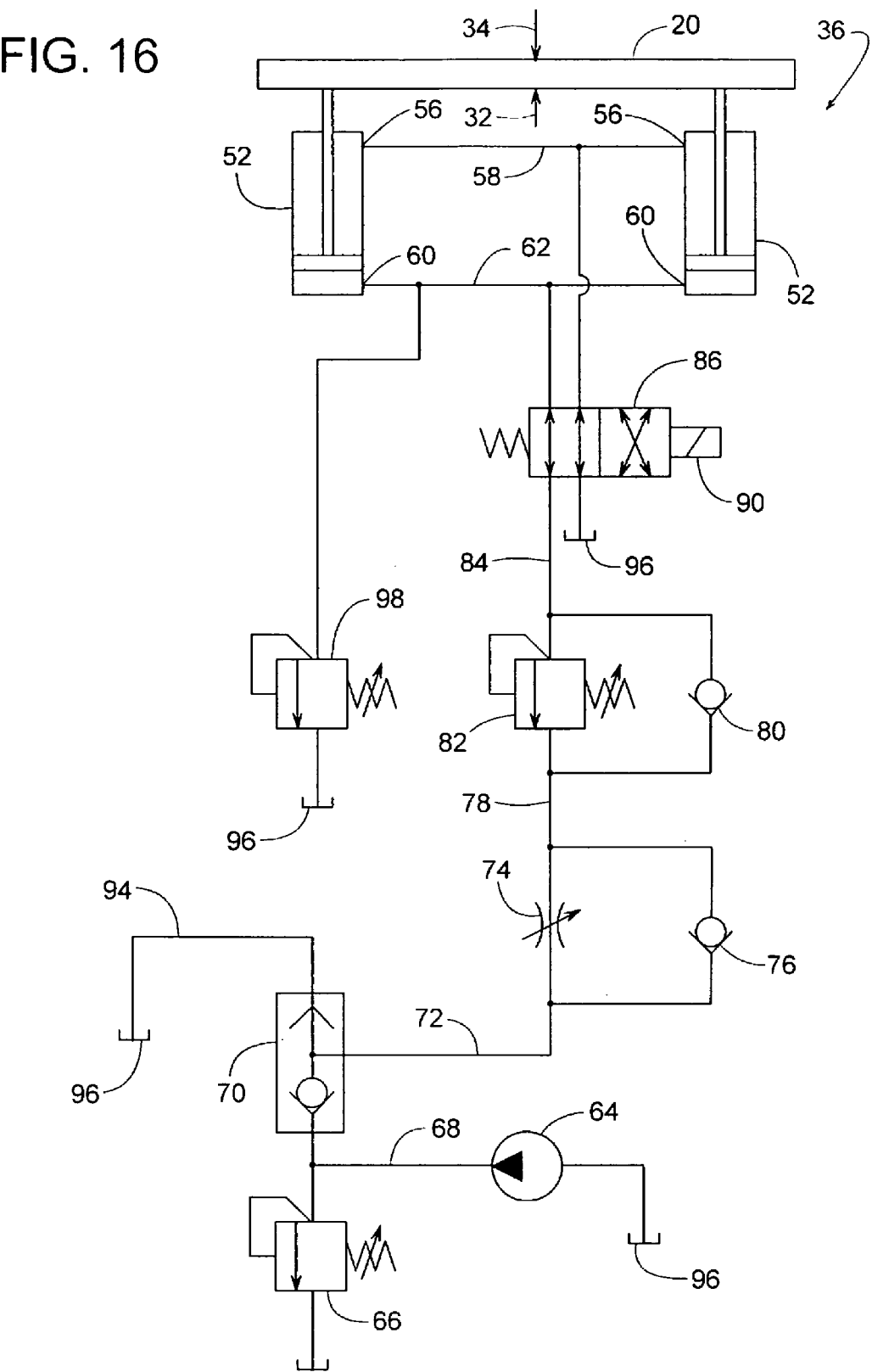
FIG. 16 is a schematic diagram of another hydraulic circuit for controlling the vehicle brace of FIG. 7.

The powered-up vehicle brace 10 of FIGS. 7-12 can also be controlled to operate in a similar manner. When controlled by system 36 of FIG. 16, support member 20 opposes the downward force 34 with a reactive force 32 that increases with the downward force 34 or the downward velocity of bar 18 but does so only up to a predetermined maximum allowable force. When downward force 34 exceeds the maximum allowable limit, the support member yields and the reactive force 32 is generally constant to slow the descent of bar 18.

Each cylinder 52 has one port 56 connected to a hydraulic line 58 of system 36 and a second port 60 connected to a line 62. The hydraulic pressure in lines 58 and 62 determines the action of cylinders 52. Hydraulic pump 64 provides system 36 with hydraulic pressure in a conventional manner. For instance, pump 64 can be cycled on and off as needed, or the pump can be associated with an appropriate system relief valve 66, and/or pump 64 could be a variable capacity pump. Regardless, pump 64 supplies pressurized hydraulic fluid at a discharge line 68, which feeds into a shuttle valve 70. Shuttle valve 70 connects discharge line 68 to a line 72 that leads to a flow restriction 74 (e.g., an orifice) and a bypass check valve 76. Another line 78 connects flow restriction 74 and check valve 76 to another check valve 80 and a first pressure relief valve 82. Another line 84 connects valves 80 and 82 to a two position, four-way valve 86, which is actuated by solenoid 90. Valve 86, in conjunction with pump 64, is used by loading dock personnel to raise or lower support member 20.

In operation, a dockworker may actuate solenoid 90 to lower carriage 42, which allows vehicle 12 to back into dock 14 and position bar 18 over support member 20. Actuating solenoid 90 pressurizes line 58 as hydraulic fluid at discharge pressure passes in series through line 68, shuttle valve 70, line 72, check valves 76 and 80, four-way valve 86, and line 58.

Once bar 18 is directly over support member 20, the dockworker de-energizes solenoid 90 and energizes pump 64 to pressurize line 62, whereby check valve 66 is set to provide just enough pressure to raise carriage 42, including a hook 48, until support member 20 and a limit switch 92, carried by carriage 42, engage the underside of bar 18. Switch 92 engaging bar 18 de-energizes pump 64; however, check valve 80 and the setting of relief valve 82 will maintain sufficient pressure in lines 62 and 84 support the weight of carriage 42, support members 20, and hook 48. So, hook 48 is now at height where it can help prevent vehicle 12 from accidentally pulling bar 18 away form dock 14, and support member 20 can help stabilize trailer bed 16 in the following manner.

If a certain amount of weight were added to trailer bed 16, bar 18 would exert a downward force 34 that would tend to push support member 20 downward. The downward movement would force hydraulic fluid from within cylinders 52 and pressurize lines 62 and 84 to a level beyond what relief valve 82 could hold. In response to the increased pressure, valve 82 would open to pass the hydraulic fluid into line 78. From line 78, the hydraulic fluid would pass in series through flow restriction 74, line 72, and shuttle valve 70. Valve 70 would then release the hydraulic fluid to a return line 94 that connects to a tank 96, which in turn provides pump 64 with hydraulic fluid.

However, as hydraulic fluid is forced through flow restriction 74, the resulting pressure drop developed access the restriction allows the pressure in line 62 and cylinders 52 to increase. The increased pressure in cylinders 52 then opposes the downward movement of bar 18 to provide bar 18 with a controlled descent (i.e., appreciably or noticeably slowing the descent of bar 18). Since the pressure drop across restriction 74 increases with the flow rate through the restriction, the opposing upward force 32 of support member 20 increases with the downward velocity of bar 18 which movement is a function of the force applied by the vehicle to member 20.

If the downward force 34 exceeds a predetermined maximum allowable limit, a second relief valve 98 is preset to release the excess pressure in line 62 to tank 96 to avoid damaging vehicle 12. For instance, if vehicle 12 has an air suspension system and the driver of the vehicle decides to deactivate the system by dumping or exhausting the system's air, trailer bed 16 may suddenly descend with its entire load, thereby rapidly forcing support member 20 down. This could result in extreme pressure developing in 62, which could cause and excessive upward force 32 being applied to the underside of bar 18. An excessive upward force could damage the bar or other parts of the trailer. So, Relief valve 98 limits the maximum allowable upward force that could be exerted by support members 20 against bar 18. In some embodiments, relief valve 97 may be set to provide a maximum allowable upward force of five to ten tons.

If vehicle 12 does not have an air suspensions system or a constant air supply is maintained to an air suspension system, then the suspension system may rapidly lift the trailer bed when forklift 30 departs or when a significant amount of weight is otherwise removed suddenly form the vehicle. Thus, vehicle 12 might lift bar 18 off of limit switch 92 and support members 20. Bar 18 separating from switch 92 energizes pump 64. This pressurizes lines 68, 72, 78, 84, and 62 to raise carriage 42. Check valve 76 is in a bypass relationship with flow restriction 74 to allow carriage 42 to move more freely upward than downward. Carriage 42 rises until switch 92 and support members 20 once again engage the underside of 18 to help stabilize trailer bed 16.

Figure 17:
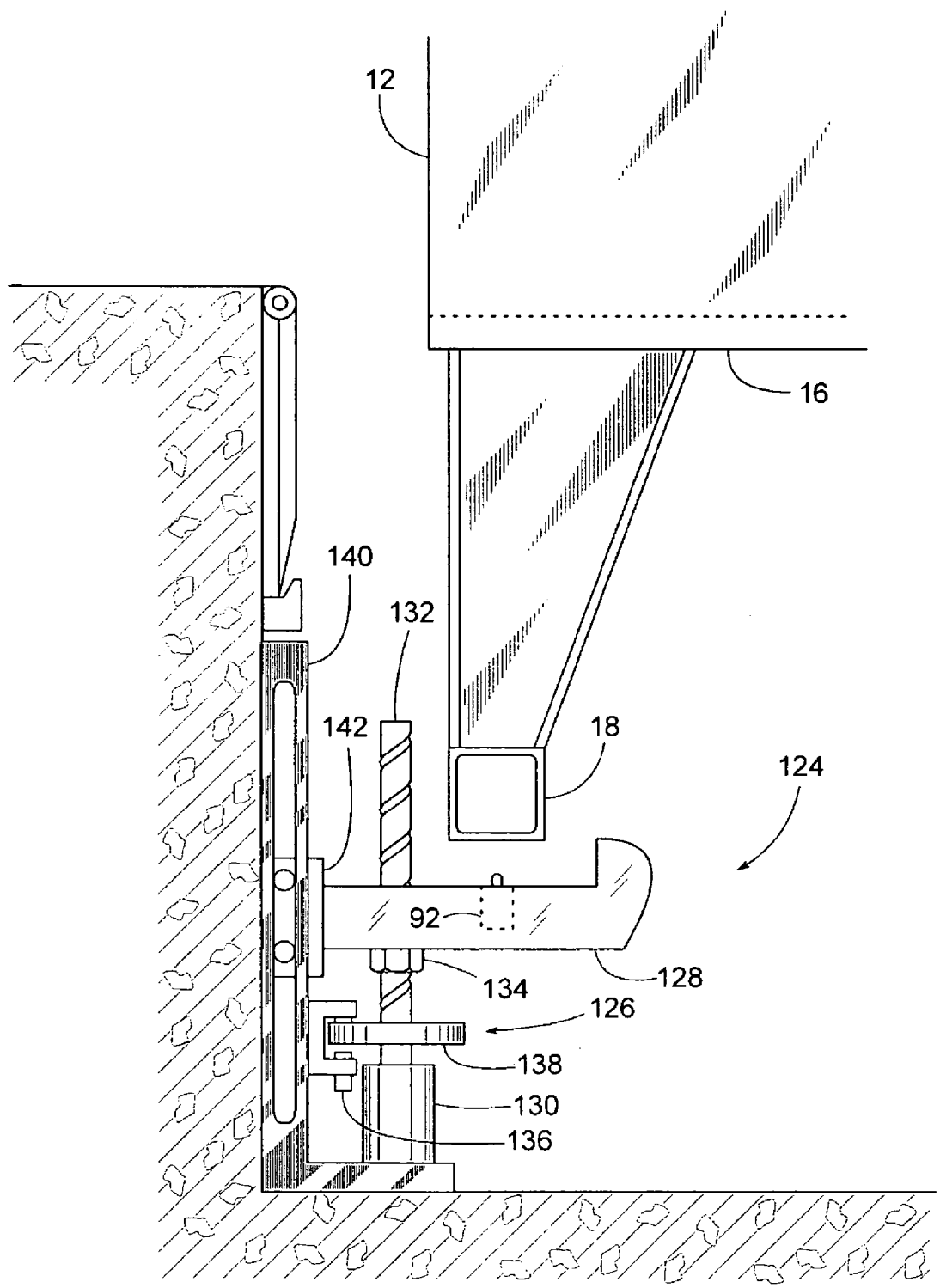
FIG. 17 is a side view of another vehicle brace.
Figure 18:
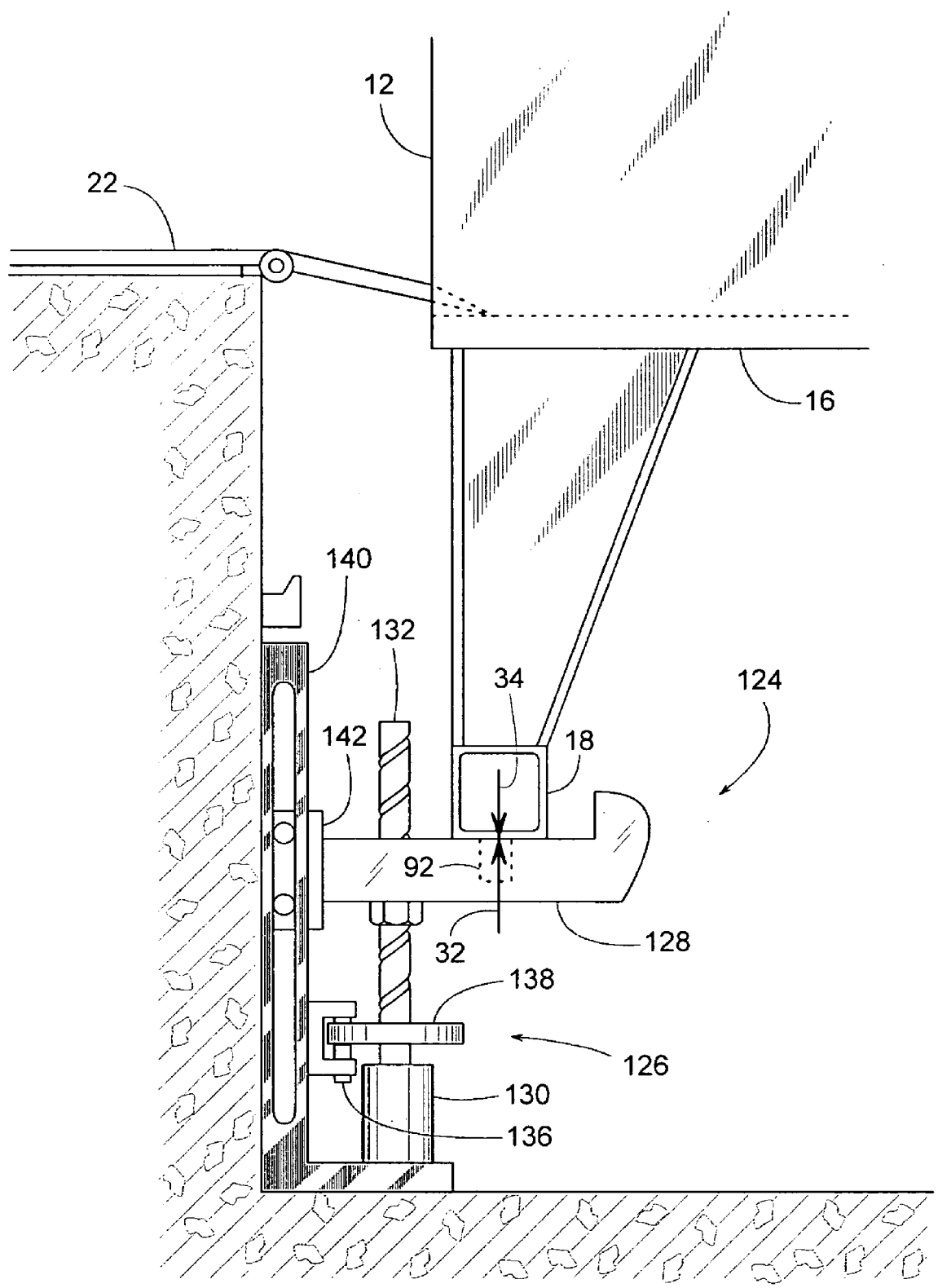
FIG. 18 is a side view similar to FIG. 17 but showing the brace raised and showing a dock leveler in an operative position.

In another embodiment, schematically illustrated in FIGS. 17 and 18, a vehicle brace 124 includes a frictional brake 126 that enables a support member 128 to exert a reactive force 32 that helps stabilize trailer bed 16. In FIG. 17, support member 128 is shown in a lowered position that allows vehicle 12 to back it bar 18 over member 128. Once bar 18 is directly over support member 128, brake 126 releases, and brace 124 lifts member 128 until member 128 engages the underside of bar 18. At this point, brake 126 is actuated to augment the vehicle's suspension by providing some resistance to downward movement of bar 18 and support member 128.

To accomplish such operation, brace 124 includes a motor 130 that rotates a lead screw 132. Lead screw 132 screws into a threaded nut 134 that is attached to support member 128. So rotating lead screw 132 can raise support member 128. Conversely, forcing support member 128 downward can rotate lead screw 132, provided the helix angle of screw 132 is sufficiently steep and the friction between screw 132 and nut 134 is sufficiently low as provided by, for example, a ball screw device. Brake 126 comprises brake calipers 136 that selectively engage a brake disc 138 on lead screw 132. A track 140 and carriage 142 help guide the vertical movement of support member 128. To move support member 128 upward, brake calipers 136 release disc 138, and motor 130 rotates counterclockwise (looking upward) until switch 92 engages bar 18. Switch 92 engaging bar 18 de-energizes motor 130 and causes calipers 136 to grip disc 138, with a predetermined or variable magnitude of resistance. Then, as weight is added to trailer bed 16, bar 18 pushes downward against support member 128, which urges lead screw 132 to turn clockwise. Brake 126, however, resists the rotation of lead screw 132, so brake 126 enables support member 128 to augment the trailer suspension by exerting reactive force 32 against bar 18, there opposing the downward movement of bar 18 and stabilizing trailer bed 16.

Figure 19:
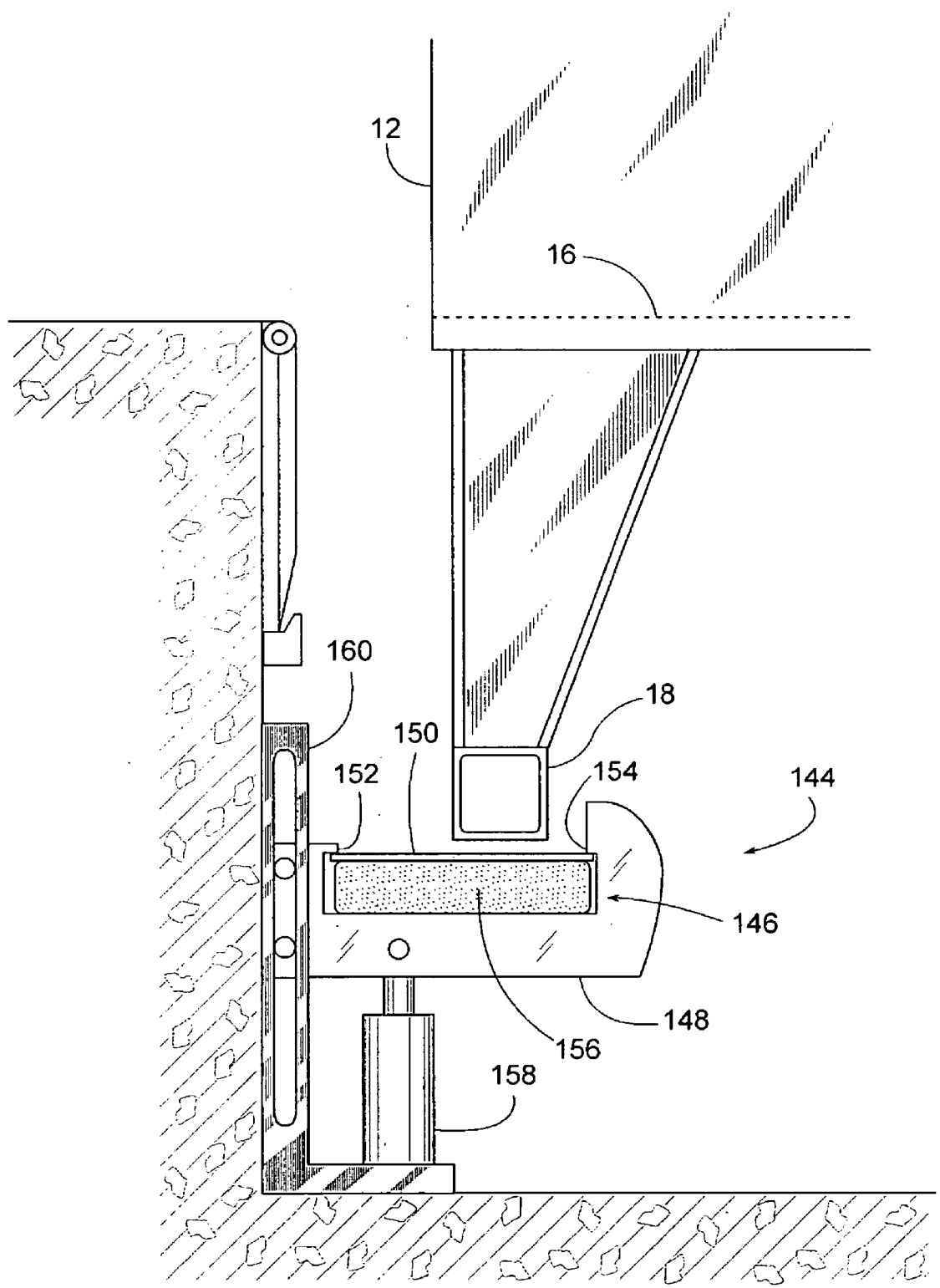
FIG. 19 is a side view of another vehicle brace.
Figure 20:
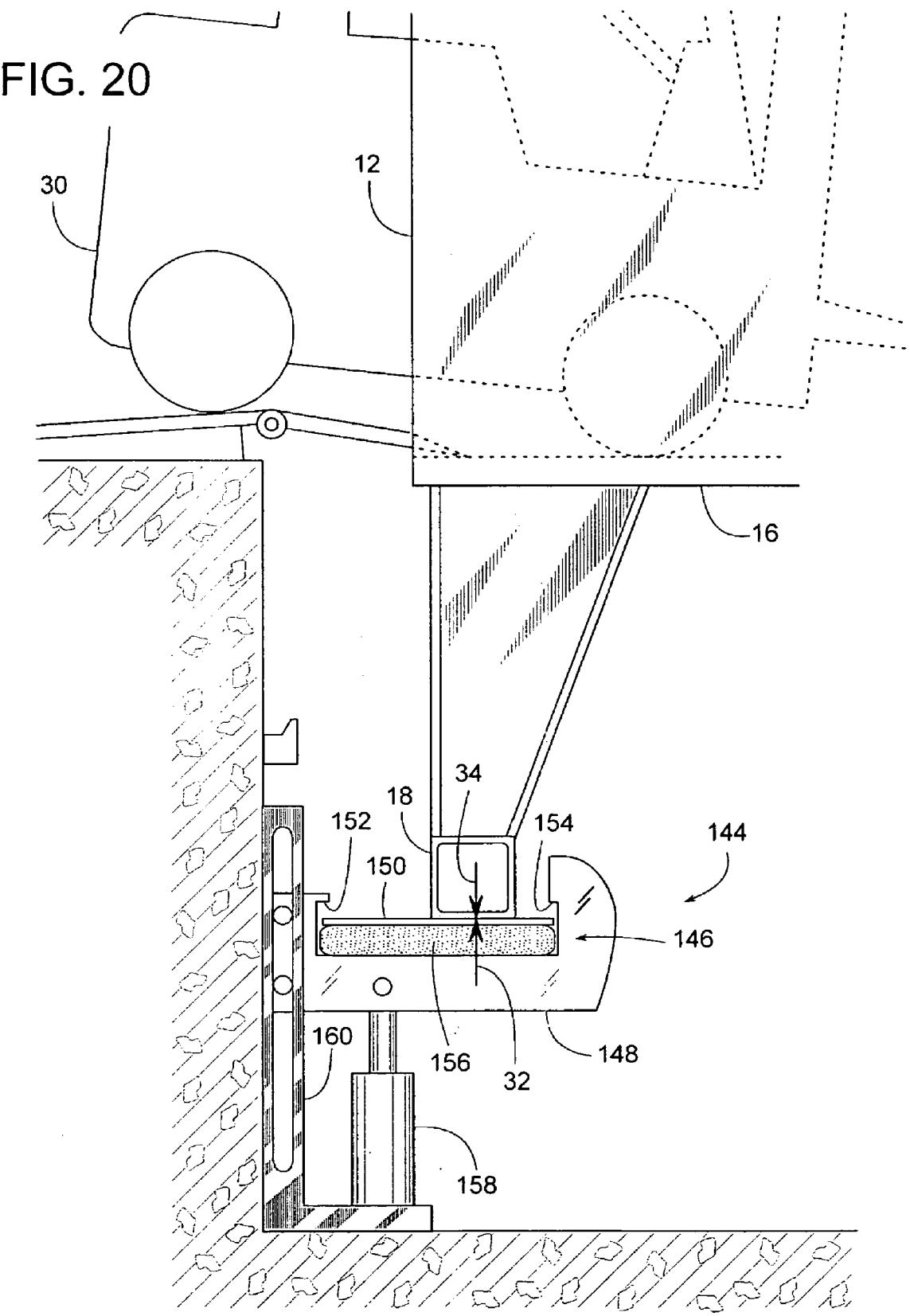
FIG. 20 is a side view similar to FIG. 19 but showing the brace raised and showing a dock leveler in an operative position.

In another embodiment, shown in FIGS. 19 and 20, a vehicle brace 144 includes a spring 146 whose stored energy enables a support member 148 to exert a reactive force 32 against bar 18, which helps stabilize trailer bed 16 during loading and unloading operations. Spring 146 represents any restorative device that can store and release mechanical energy. Examples of spring 146 include, but are not limited to, one or more leaf springs, coil springs, air springs, air cylinder springs polyurethane springs, series of Belleville washers, etc. In some embodiments, spring 146 of support member 148 includes a metal top plate 150 that engages two restraining edges 152 and 154 of support member 148 to hold a resiliently compressible polyurethane block 156 in a preloaded, partially compressed state, as shown in FIG. 19.

An actuator 158 is connected to move support member 148 vertically along a track 160. Actuator 158 is schematically illustrated to represent any device adapted for moving support member 148. Examples of actuator 158 include, but are not limited to a gas filed piston/cylinder, a liquid filled piston/cylinder, rod less cylinder, spring-return piston/cylinder, vehicle-operated actuator, linear motor, chain and sprocket, rack and pinion, winch, electric motor, hydraulic motor, air powered motor, pressurized fluid filled bladder, spring, etc.

In operation, actuator 158 lifts support member 148 until top plate 150 of member 148 is up against bar 18. If bar 18 exerts a downward force 34 that is within a certain allowable range, then actuator 158 stays still, and spring 146 compresses to resist the downward movement of trailer bed 16. If, however, downward force 34 becomes excessive and beyond the allowable range, then actuator 158 is allowed to descend until force 34 is once again with the allowable range.

Figure 21:
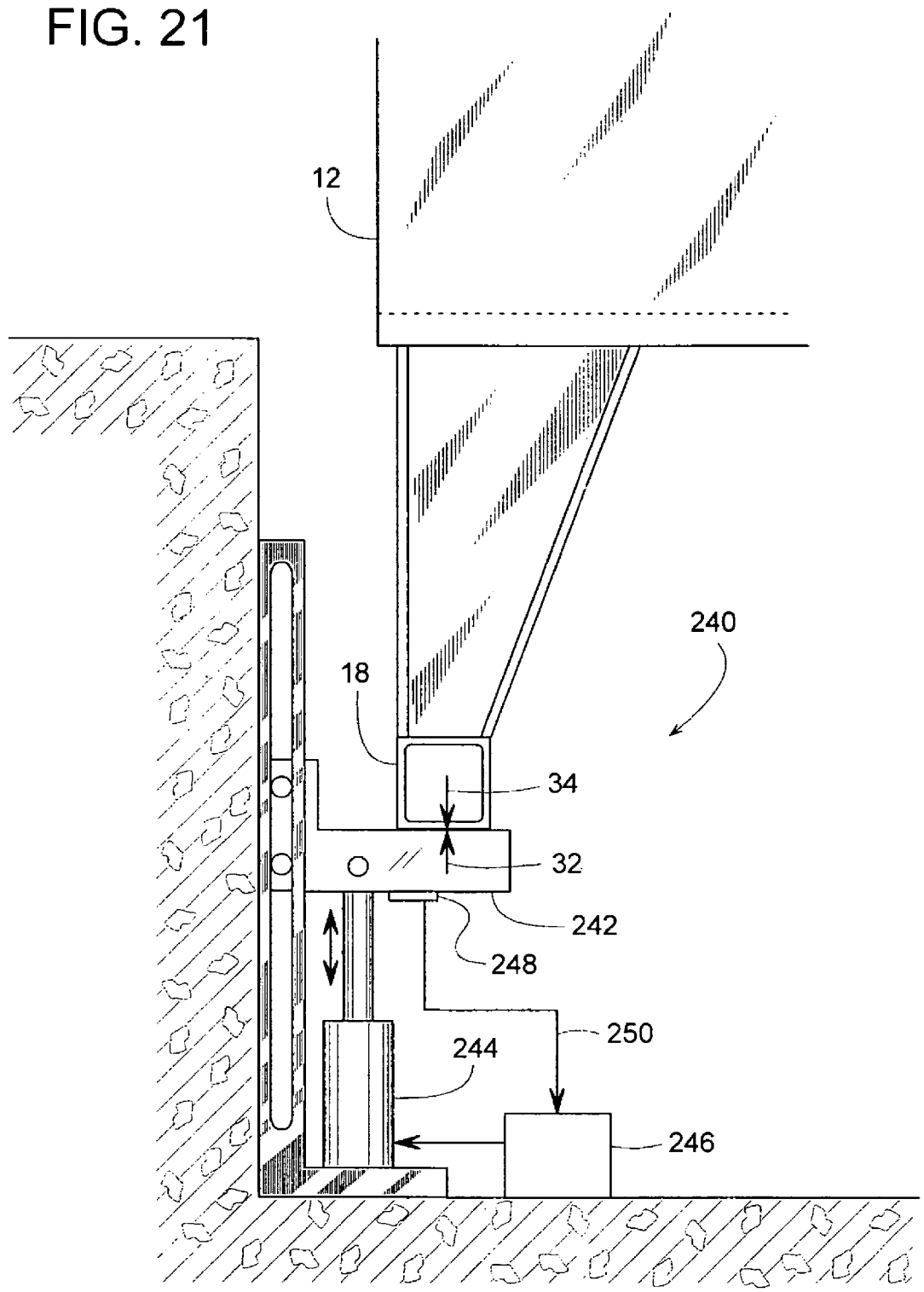
FIG. 21 is a conceptual schematic diagram of an idealized vehicle brace.

For the embodiment of FIG. 21, a vehicle brace 240 comprises a vertically movable support member 242, an actuator 244 for moving support member 242, and a control system 246 that controls the support member's movement in response to a sensor 248. Actuator 244 is schematically illustrated to represent any device that can move support member 242. Examples of actuator 244 include, but are not limited to, gas filled piston/cylinder, a liquid filled piston/cylinder, rod les cylinder, spring-return piston/cylinder, linear motor, chain and sprocket, rack and pinion, winch, electric motor, hydraulic motor, air powered motor, pressurized fluid filled bladder, etc. Sensor 248 is schematically illustrated to represent any device that can detect a load or force 34 being applied to support member 242 and provide feedback 250 that corresponds to the load. Examples of sensor 248 include but are not limited to, a strain gage, load cell, weight scale, pressure sensor, etc. Control system 246 is schematically illustrated to represent any device that can control actuator 244 in response of feedback 250 from sensor 248. Examples of control system 246 include, but are not limited to a computer; microprocessor; PLC (programmable logic controller); integrated circuits; circuits comprising relays, analog component, and/or digital component; and various combinations thereof.

As bar 18 exerts force 34 down against support member 242, sensor 248 detects the magnitude of force 34 and provides that information as feedback 250 to control system 246. In response to feedback 250, control system 246 command actuator 244 to control support member 242 so that member 242 exerts an appropriate upward reactive force 32 that opposes force 34. The results provided by vehicle brace 240 could be an idealized response (i.e. reactive force 32 is always equal and opposite to force 34), or brace 240 could emulate any one of the various vehicles braces already described, for instance, by yielding when the applied load meets or exceeds a maximum allowable force.

Although the invention is described with reference to preferred embodiments, it should be appreciated by those skilled in the art that various modifications are well within the scope of the invention. For example, although various vehicle braces are shown to include a hook that helps prevent a vehicle from accidentally pulling away from the loading dock, such a hook is optional. Therefore, the scope of the invention is to be determined by reference to the claims that follow.

We claim:

1. A method of operating a vehicle brace engagable adjacent a vehicle's rear edge as material handling equipment traverses the rear edge while accessing the vehicle, the method comprising:
   continuously exerting an upward biasing force on the vehicle brace by way of a first actuation system, wherein the upward biasing force is greater than the weight of the vehicle brace such that the vehicle brace is continuously biased to a raised position but that the upward biasing force does not substantially influence vertical movement of the vehicle brace when the vehicle brace is being engaged by a vehicle;
   selectively causing, by way of a second actuation system, the vehicle brace to apply a reactive upward force separate from the upward biasing force and adjacent the vehicle's rear edge, wherein the reactive upward force substantially reduces downward movement of the vehicle's rear edge that would result from the applied weight of the material handling equipment in the absence of the reactive upward force;
   limiting the reactive upward force to a predetermined upper limit; and
   wherein the reactive upward force reduces downward movement of the vehicle's rear edge by being substantially equal to a downward force resulting from the weight of the material handling equipment until the reactive upward force reaches the predetermined upper limit.

2. The method of claim 1, further comprising allowing the brace to yield for a reactive upward force that exceeds the predetermined upper limit.

3. The method of claim 1, wherein the reactive upward force is created by preventing movement of the brace until the reactive upward force reaches the predetermined upper limit.

4. The method of claim 1, further comprising increasing the reactive upward force in response to an increase in a rate of descent of the vehicle's rear edge.

5. The method of claim 4, wherein increasing the reactive upward force is carried out by forcing fluid through a flow restriction.

6. The method of claim 1, wherein causing the vehicle brace to exert a reactive upward force is carried out by applying frictional drag.

7. The method of claim 1, further comprising sensing when the vehicle is about to be loaded or unloaded.

8. The method of claim 1, further comprising raising a vehicle restraining member to limit horizontal movement of the vehicle.

9. The method of claim 1, further comprising permitting the vehicle brace to be lowered to a preparatory position upon interaction with the vehicle, prior to selectively causing the vehicle brace to apply the reactive upward force.

10. The method of claim 1, wherein the first actuation system comprises a spring and the second actuation system comprises an actuator.

11. The method of claim 1, further comprising positioning nonmovably one end of each of the first and second actuation systems.

12. A method of operating a vehicle brace engagable adjacent a vehicle's rear edge as material handling equipment traverses the rear edge while accessing the vehicle, the method comprising:
   biasing the vehicle brace to a raised position by continuously exerting on the brace an upward biasing force that exceeds the weight of the vehicle brace;
   permitting the vehicle brace to be pushed down to a preparatory position by horizontal movement of the vehicle as the vehicle moves toward the loading dock and is in engagement with the vehicle brace;
   selectively causing the vehicle brace to apply a reactive upward force adjacent the vehicle's rear edge, wherein the reactive upward force is to reduce downward movement of the vehicle's rear edge that would result from the applied weight of the material handling equipment in the absence of the reactive upward force;
   limiting the reactive upward force to a predetermined upper limit; and
   wherein the reactive upward force is to reduce downward movement of the vehicle's rear edge by being substantially equal to a downward force resulting from the weight of the material handling equipment until the reactive upward force reaches the predetermined upper limit.

13. The method of claim 12, further comprising allowing the brace to yield for a reactive upward force that exceeds the predetermined upper limit.

14. The method of claim 12, wherein the reactive upward force is created by preventing movement of the brace until the reactive upward force reaches the predetermined upper limit.

15. The method of claim 12, further comprising increasing the reactive upward force in response to an increase in a rate of descent of the vehicle's rear edge.

16. The method of claim 15, wherein increasing the reactive upward force comprises forcing fluid through a flow restriction.

17. The method of claim 12, further comprising raising a vehicle restraining member to limit horizontal movement of the vehicle.

18. The method of claim 12, wherein engagement of the vehicle with a sloped guide surface of the vehicle brace during horizontal movement of the vehicle pushes the vehicle brace down to a preparatory position.

19. A method of operating a vehicle brace engagable adjacent a vehicle's rear edge as material handling equipment traverses the rear edge while accessing the vehicle, the method comprising:

biasing, by way of a first actuation system, a support member to a raised position by continuously exerting on the support member an upward biasing force;

selectively causing, by way of a variable length second actuation system, the support member to exert a reactive upward force against the vehicle's rear edge to appreciably and controllably slow the descent of the vehicle;

controlling, by way of a control system, a magnitude of the reactive upward force;

limiting the reactive upward force to a predetermined upper limit; and wherein the reactive upward force is to reduce downward movement of the vehicle's rear edge by being substantially equal to a downward force resulting from the weight of the material handling equipment until the reactive upward force reaches the predetermined upper limit.

20. The method of claim 19, further comprising allowing the support member to yield for a reactive upward force that exceeds the predetermined upper limit.

21. The method of claim 19, wherein the reactive upward force is created by preventing movement of the support member until the reactive upward force reaches the predetermined upper limit.

22. The method of claim 19, further comprising increasing the reactive upward force in response to an increase in a rate of descent of the vehicle's rear edge.

23. The method of claim 19, further comprising raising a vehicle restraining member to limit horizontal movement of the vehicle.

\* \* \* \* \*